(12) United States Patent
Yan et al.

(10) Patent No.: US 7,283,517 B2
(45) Date of Patent: Oct. 16, 2007

(54) STAND ALONE MULTI-MEDIA TERMINAL ADAPTER WITH NETWORK ADDRESS TRANSLATION AND PORT PARTITIONING

(75) Inventors: Kan Yan, San Jose, CA (US); Szu-Ming Lee, Hsin-Foung Hsiang (TW); Chih-Ping Lee, Cupertino, CA (US)

(73) Assignee: Innomedia PTE, Singapore (SG)

( * ) Notice: Subject to any disclaimer, the term of this patent is extended or adjusted under 35 U.S.C. 154(b) by 933 days.

(21) Appl. No.: 10/624,256

(22) Filed: Jul. 22, 2003

(65) Prior Publication Data

US 2005/0018651 A1   Jan. 27, 2005

(51) Int. Cl.
*H04L 12/66* (2006.01)
(52) U.S. Cl. .................................. 370/352; 370/493
(58) Field of Classification Search ............. 370/352, 370/485, 493, 401; 379/219; 709/228
See application file for complete search history.

(56) References Cited

U.S. PATENT DOCUMENTS

| | | | | |
|---|---|---|---|---|
| 6,128,664 | A * | 10/2000 | Yanagidate et al. | 709/228 |
| 6,944,167 | B1 * | 9/2005 | McPherson | 370/401 |
| 7,002,995 | B2 * | 2/2006 | Chow et al. | 370/485 |
| 7,035,289 | B2 * | 4/2006 | Devine et al. | 370/493 |
| 7,142,660 | B2 * | 11/2006 | Freyman et al. | 379/219 |

OTHER PUBLICATIONS

Comer, Douglas E., Internetworking With TCp/IP vol. I: Principles, Protocols, and Architecture, 4th edition, 2000, Prentice Hall, pp. 204-205, 243-244.*

* cited by examiner

*Primary Examiner*—Chi Pham
*Assistant Examiner*—Albert T. Chou
(74) *Attorney, Agent, or Firm*—Timothy P. O Hagan

(57) ABSTRACT

A multi-media terminal adapter couples to a network access module over a communication link. The network access module communicates IP frames over a frame switched network. The multi-media terminal adapter comprises a wide area network interface coupled to the communication link for exchanging IP frames with the access module and a local area network interface for receiving outbound data client IP frames from each of a plurality of data clients. Each outbound data client IP frame comprises a socket information that includes a local area network IP address and a data client port number. A VoIP module generates outbound VoIP frames. Each outbound VoIP frame comprises socket information that includes a VoIP port number selected from a first group of port numbers exclusively reserved for use by the VoIP module. A router module is coupled between the wide area network interface and each of the VoIP module and the local area network interface. The router receives the outbound data client IP frames and the outbound VoIP frames and performs port translation on only the outbound data client IP frames.

22 Claims, 14 Drawing Sheets

UDP Translation Table 170a

| Index 174 | Local Socket Information 175 | | | | Global Socket Information 177 | | | | Time Out 186 |
|---|---|---|---|---|---|---|---|---|---|
| | Source IP Address | Source Port # | Destination IP Address | Destination Port # | Source IP Address | Source Port # | Destination IP Address | Destination Port # | |
| 1 | DC 176 | DC 178 | 182 | 184 | MTA 185 | MTA 180 General | 182 | 184 | |
| 2 | MTA 185 | VOIP 258 | 182 | 184 | MTA 185 | VOIP 258 | 182 | 184 | |
| 3 | Module 260 | VOIP 258 | 182 | 184 | MTA 185 | VOIP 258 | 182 | 184 | |

TCP Translation Table 170b

| Index 174 | Local Socket Information 175 | | | | Global Socket Information 177 | | | | Time Out 186 |
|---|---|---|---|---|---|---|---|---|---|
| | Source IP Address | Source Port # | Destination IP Address | Destination Port # | Source IP Address | Source Port # | Destination IP Address | Destination Port # | |
| 1 | DC 176 | DC 178 | 182 | 184 | MTA 185 | MTA 180 General | 182 | 184 | |

ICMP Translation Table 170c

| Index 174 | Source IP Address | Destination IP Address | Sequence Number | ICMP Type | Global Source IP Address | Time Out 186 |
|---|---|---|---|---|---|---|
| 1 | DC 176 | 182 | 187 | 189 | MTA 185 | |
| 2 | MTA 185 | 182 | 187 | 189 | MTA 185 | |
| 3 | Module 260 | 182 | 187 | 189 | MTA 185 | |

Figure 2b

| Message Title | Exemplary Data Fields |
|---|---|
| Dynamic Service Addition (DSA) | Service Flow Reference |
| | Requested Framing Frequency |
| | Requested Frame Size |
| | Requested Jitter |
| | Requested QoS Policy |
| | Requested Service State |
| | Discriminator Identification |
| Dynamic Service Change (DSC) | Service Flow ID |
| | Requested Framing Frequency |
| | Requested Frame Size |
| | Requested Jitter |
| | Requested QoS Policy |
| | Requested Service State |
| | Discriminator Identification |
| Dynamic Service Delete (DSD) | Service Flow ID |

Figure 7

| Message Title | Exemplary Data Fields | |
|---|---|---|
| Dynamic Service Addition Acknowledge (DSA_ACK) 122 | Service Flow Reference | 122a |
| | Service Flow ID | 122b |
| | Acknowledged Framing Period | 122c |
| | Acknowledged Frame Size | 122d |
| | Acknowledged Jitter | 122e |
| | Acknowledged QoS Policy | 122f |
| | Acknowledged Service State | 122g |
| | Acknowledged Discriminator ID | |
| Dynamic Service Change Acknowledge (DSC_ACK) 124 | Service Flow ID | 124a |
| | Acknowledged Framing Period | 124b |
| | Acknowledged Frame Size | 124c |
| | Acknowledged Jitter | 124d |
| | Acknowledged QoS Policy | 124e |
| | Acknowledged Service State | 124f |
| | Acknowledged Discriminator ID | 124g |
| Dynamic Service Delete Acknowledge (DSD_ACK) 126 | Service Flow ID | 126a |

Figure 8

STAND ALONE MULTI-MEDIA TERMINAL ADAPTER WITH NETWORK ADDRESS TRANSLATION AND PORT PARTITIONING

TECHNICAL FIELD

The present invention relates to multi-media terminal adapters for providing real time streaming media communications over a wide area packet switched network, and in particular to systems and methods for bandwidth management.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each of the two endpoint telephones is coupled to a local switching station by a dedicated pair of copper wires known as a subscriber loop. The two switching stations are connected by a trunk line network comprising multiple copper wire pairs. When a telephone call is placed, the circuit is completed by dynamically coupling each subscriber loop to a dedicated pair of copper wires in the trunk line network that completes the circuit between the two local switching stations.

A key advantage of a circuit switched network is that a dedicated circuit is continually connected between the two endpoints and capable of carrying information at a fixed rate (in this case, a voice audio signal) for the entire duration of the call. A disadvantage of a circuit switched network is the size and expense of trunk lines between switching stations that must be large enough to provide a dedicated pair of copper wires for each circuit.

More recently the trunk lines between switching stations have been replaced with fiber optic cables. A computing device digitizes the analog signals of each circuit and formats the digitized data into frames such that multiple conversations can be transmitted simultaneously on the same fiber utilizing a time division protocol. At the receiving end, a computing device reforms the analog signals of each circuit for coupling to the copper wires of the subscriber loop. Fiber optic cable increases trunk line capacity between switching stations and simultaneously reduces trunk line cost.

More recently yet, telephone service has been implemented over the Internet. Advances in the speed of data transmissions and Internet bandwidth have made it possible for telephone conversations to be communicated using the Internet's packet switched architecture and the TCP/IP protocol.

Software and hardware peripherals are available for use with personal computers which enable the two-way transfer of real-time voice information via an Internet data link between two personal computers (each of which is referred to as an end point), each end point computer includes appropriate hardware for driving a microphone and a speaker. Each end point operates simultaneously as both a sender of real time voice data and as a receiver of real time voice data to support a full duplex voice conversation. As a sender of real time voice data, the end point computer converts voice signals from analog format, as detected by the microphone hardware, to digital format. The software then facilitates data compression down to a rate compatible with the end point computer's data connection to an Internet Service Provider (ISP) and facilitates encapsulation of the digitized and compressed voice data into the TCP/IP protocol, with appropriate addressing to permit communication via the Internet.

As a receiver of real time voice data, the end point computer and software reverse the process to recover the analog voice information for presentation to the other party via the speaker associated with the receiving computer.

In a separate field of development, cable television providers have begun utilizing their co-axial cable networks and hybrid fiber optic/coaxial cable network (HFC networks) to provide internet services. A subscriber uses a cable modem to communicate IP frames over the HFC network. The cable modem operates as a bridge transferring IP frames between the HFC network and a local network port, such as an Ethernet port or USB port, which in turn couples to a computing device.

More recently, cable service providers have contemplated providing telephone service over their HFC networks. To provide telephone service, the subscriber uses a multimedia terminal adapter (MTA). The MTA operates as a VoIP client for setting up and maintaining VoIP calls over the HFC network and emulates a PSTN central office for interfacing with a subscribers legacy PSTN equipment, such as telephones and fax machines, over a twisted pair subscriber loop.

The MTA may be embedded in the cable modem. When a cable modem with embedded MTA is utilized, the cable modem operates as a bridge or a switch between the HFC and each of the MTA and any computer device coupled to the local network port. Each of the MTA and the computer independently obtain a distinct global IP address from the service provider.

Another known solution is a stand alone MTA which couples to the cable modem's local network port. An advantage of a stand alone MTA is that it operates with legacy cable modems. A problem with a stand alone MTA is that the cable modem can not be shared with any other computing device because the MTA occupies the cable modem's local network port.

In a third known solution a switch enabled stand alone MTA (such as early versions of the MTA 3328 available from Innomedia, Inc. of Milpitas, Calif.) includes a switch circuit and a downlink local network port in conjunction with MTA circuitry. A computing device may be coupled to the downlink local network port. Each of the computing device and the MTA circuit coupled to the cable modem through the switch circuit and each independently obtains a unique global IP address from the service provider. As such, the cable modem can be shared between the stand alone MTA and a computing device. A problem with this solution is that the quantity of unique global IP addresses is limited and it is costly for the service provider to provide two globally unique IP addresses to a customer who utilizes the cable modem for both internet connectivity and telephony services.

In another unrelated field, network address and port translation gateways (NAPT gateway) have been developed to allow multiple devices (each assigned a non-globally-unique local area network IP address) to share a single globally unique IP address assigned to the gateway. Each IP frame includes an IP header appended onto either a TCP or UDP frame. The TCP or UDP frame comprises a TCP or UDP header appended onto a higher level frame (or a portion of a higher level frame). The higher level frame may comprise higher level headers and payload.

The IP header comprises various miscellaneous headers along with a source IP address and a destination IP address. The IP source address comprises the IP address of the system which generated the IP frame. In the case of a computer coupled to a NAPT gateway, the source IP address will be a locally assigned IP address selected from a group of IP addresses reserved for use on local area networks and which are non-routable on the Internet.

The TCP or UDP header comprises various headers along with a source port number and a destination port number. The destination port number is a logical port number associated with the particular application on the destination computer that is to receive the payload. The use of a destination port number enables the destination computer to route the frame to the correct application. The source port number is a logical port number assigned by the source computer and is associated with the application that generated the payload. Use of the source port number enables the destination computer to return a frame, such as an acknowledge, back to the source application on the source computer.

TCP/IP connections are typically used for data transfer where data accuracy is more important than timely delivery of frames while UDP/IP channels are typically used for real time VoIP frames where timely delivery is more important that data accuracy. The miscellaneous headers of a UDP/IP frame are typically shorter than the UDP/IP headers of a TCP/IP frame.

To enable multiple devices to share a single globally unique IP address, a NAPT gateway will translate outbound frames by replacing the local source IP address with the globally unique IP address assigned by the service provider to the gateway and by replacing the source port number with a port number selected by the gateway. A record of the local source IP address, the original source port number, the translated globally unique IP address and the translated source port number are stored in a translation tables. As such, when a response frame, such as an acknowledge frame, is received from the gateway, the gateway may reverse translate the inbound frame so that it may be delivered to the correct application on the correct computer on the local area network.

An NAPT gateway can be coupled to the local area network port of a cable modem to enable multiple IP devices to share a single globally unique IP address assigned to the gateway. However, a stand alone MTA can not be one of those devices. A challenge associated with connecting an MTA to an NAPT gateway is that VoIP call set up protocols require a VoIP client to specify a port number that the other client may utilize as a destination port number for sending a stream of UDP/IP frames to the MTA. There is no generally available mechanism for enabling a device on a local area network (behind a NATP gateway) to define a gateway port number and reverse translation parameters for receipt of inbound frames.

To allow a stand alone MTA to properly operate, it must be coupled to the cable modem and independently obtain a globally unique IP address from the service provider. An NAPT gateway can be coupled to the switch enabled MTA. Such structure would enable multiple computers and such MTA to share the cable modem connection to the HFC. However, this structure does not resolve the problem that the service provider must still assign separate and distinct globally unique IP addresses to each of the MTA and the NAPT gateway.

As such, a need exists for a solution that enables voice telephone service to be provided over an HFC network that operates in conjunction with legacy cable modems and permits the sharing of the cable modem and a single globally unique IP Address assigned by a service provide amongst VoIP services and multiple computers.

SUMMARY OF THE INVENTION

A first aspect of the present invention is to provide a stand alone multi-media terminal adapter for coupling to a network access module (such as a cable modem) over a communication link. The network access module communicates IP frames over a frame switched network (such as a hybrid fiber-coaxial cable network). The multi-media terminal adapter comprises a wide area network interface coupled to the communication link for exchanging IP frames with the access module.

The multi-media terminal adapter further comprises a local area network interface for receiving outbound data client IP frames from each of a plurality of data clients. Each outbound data client IP frame comprises local socket information that includes a local area network IP address and a data client port number.

A VoIP module generates outbound VoIP frames; each outbound VoIP frame comprises digital audio data and socket information. The socket information includes a VoIP port number selected from a first group of port numbers exclusively reserved for use by the VoIP module.

A router module is coupled between the wide area network interface and each of the VoIP module and the local area network interface. The router comprises: i) means for receiving the outbound data client IP frames and the outbound VoIP frames; ii) means for performing port translation on the outbound data client IP frames to generate translated outbound data client IP frames, and iii) means for providing the outbound VoIP frames and the translated outbound data client IP frames to the wide area network interface.

Each translated outbound data client IP frame comprises payload from the outbound data client IP frame and global socket information comprising a global IP address of the multi-media terminal adapter and a translated port number selected from a second group of port numbers. The second group of port numbers is mutually exclusive of the first group of port numbers and exclusively reserved for port translation of outbound data client IP frames.

The VoIP module may further includes a call set up module for establishing inbound VoIP communication channels by providing a remote VoIP device with the global IP address and an inbound VoIP port number selected from the first group of port numbers.

The router module may further comprise: i) a translation table storing each translated port number in association with the local area network IP address and the data client port number associated therewith; ii) means for receiving inbound IP frames, each inbound IP frame being addressed to the global IP address and including a destination port number; iii) means for routing the inbound IP frame to the VoIP client if the destination port number is within the first group of port numbers; and iv) means for generating a reverse translated IP frame if the destination port number is within the second group of port numbers. The reverse translated frame comprises payload from the inbound IP frame and includes a destination address comprising the local area network IP address and the data client port number, that associated with the translated port number, replacing the global IP address and the destination port number from the inbound frame respectively.

In one embodiment, the socket information of each outbound VoIP frame generated by the VoIP module further includes a source IP address which comprises the global IP address of the multi-media terminal adapter. In such embodiment, the router module further comprises means for routing the outbound VoIP frame generated by the VoIP module utilizing the source IP address and source port number assigned by the VoIP module.

In a second embodiment, the socket information of each outbound VoIP frame generated by the VoIP module further includes a source IP address which comprises an IP address that is different from the global IP address. In such second embodiment, the router module further comprises means for translating only the IP address of each outbound VoIP frame prior to providing the outbound VoIP frame to the wide area network interface and routing a translated outbound VoIP frame utilizing the global IP address of the multi-media terminal adapter an the source port number assigned by the VoIP module.

In either embodiment, the router module may further comprise means for routing the inbound IP frame to a signaling module of the VoIP module if the destination port number is within a third group of port numbers. The third group of port numbers being: i) mutually exclusive of the first group of port numbers and the second group of port numbers; and ii) exclusively reserved for VoIP session signaling frames.

In either embodiment, the multi-media terminal adapter may further comprise a bandwidth management module coupled between the VoIP client and the wide area network interface for providing bandwidth management instructions to the access module and receiving acknowledgement messages from the access module. Each bandwidth management instruction may command the access module to establish a time division logical channel over the frame switched network for supporting the exchange of IP frames between the multi-media terminal adapter and a remote VoIP endpoint. The instruction to establish a time division logical channel comprises a discrimination identifier identifying a characteristic of the IP frames to which the time division logical channel will apply. The identifier may be the VoIP port number from the first group of port numbers.

BRIEF DESCRIPTION OF THE DRAWINGS

FIG. 2b is a table diagram representing exemplary translation tables;

FIG. 7 is a table representing exemplary band with management instructions in accordance with one embodiment of the present invention;

FIG. 8 is a table representing exemplary acknowledgment messages in accordance with one embodiment of the present invention;

DETAILED DESCRIPTION OF THE EXEMPLARY EMBODIMENTS

Figure 1:
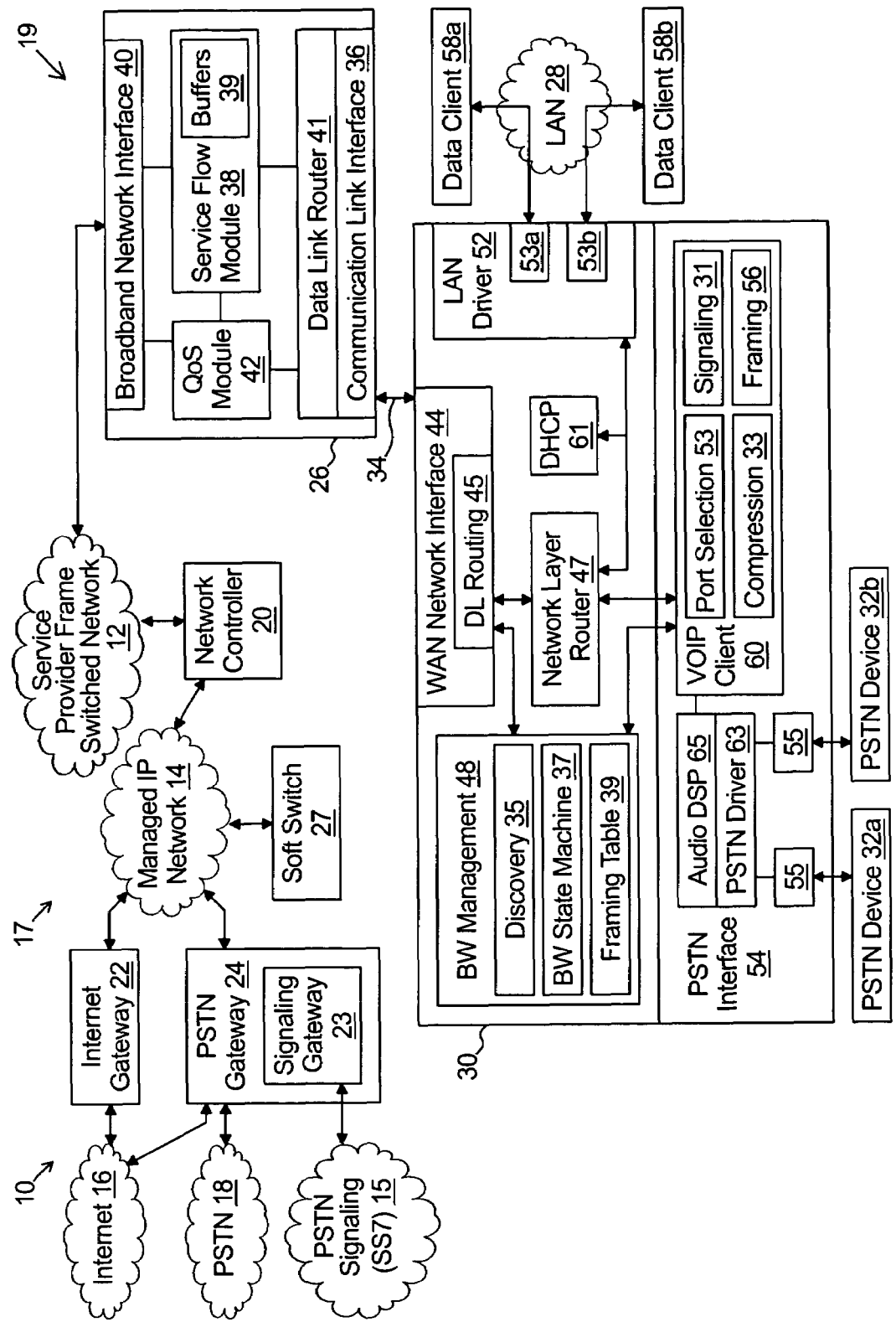
FIG. 1 is a block diagram representing a system for providing VoIP communication services and Internet data connectivity over a frame switched network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a system 10 for providing both voice communications and Internet data connectivity to a subscriber over a frame switched network 12, for example, a hybrid fiber/cable (HFC) network. The system 10 comprises a service provider's back end systems 17 interconnected with a plurality of subscriber systems 19 by the service provider network 12.

The service provider's back end systems 17 may comprise a network controller 20, for example a cable modem termination server (CMTS), an Internet gateway 22, a soft switch 27, and a PSTN gateway 24 interconnected by a managed IP network 14. The network controller 20 includes known technologies for operating as a router of IP frames between the network 12 and the managed IP network 14.

The Internet gateway 22 may use known IP routing technologies for routing IP frames between the managed IP network 14 and the Internet 16 based on each frames destination IP address.

The soft switch 27 may be a known system that provides the proxy server functions of the various Session Initiation Protocols (SIP) or the call agent functions of the Multimedia gateway Control Protocols (MGCP) for signaling VoIP media sessions.

The PSTN gateway 24 may be a known trunking gateway for interfacing between VoIP call legs (e.g. call sessions over the PSTN 18) and PSTN call legs (e.g call sessions utilizing VoIP point-to-point logical channels between the PSTN gateway 24 and an MTA 30 of a subscriber system 19). The PSTN gateway 24 may include (or be associate with) a known signaling gateway 23 for interfacing with a PSTN signaling network (e.g. SS7 network) 15.

Each subscriber system 19 may comprise a network access module 26 which may be a cable modem, a stand alone multi-media terminal adapter (MTA) 30, a plurality of data clients 58a and 58b coupled to the MTA 30 by a local area network 28, and a plurality of PSTN devices 32a and 32b.

The access module 26 couples to the network 12 and to the MTA 30 by a communication link 34. The access module 26 and the network controller 20 include known technologies for exchanging IP frames over the network 12 utilizing known protocols. In the example wherein the access module is a cable modem and the network 12 is an HFC network, the known protocols include the DOCSIS protocols. As such, the access module 26 provides an interface for transferring IP frames between the MTA 30 and network 12. A more detailed description of the access module 26 is included herein.

Each of the data clients 58a and 58b may be a PC or other computing device capable of exchanging data with other computing devices over an IP enabled network such as the LAN 28. Each of the PSTN devices 32a and 32b may be standard PSTN telephones, fax machines, and other standard PSTN devices.

MTA

The MTA 30 operates as a network address and port translation gateway for the plurality of data clients 58a and 58b and operates as a PSTN gateway for the plurality of PSTN devices 32a and 32b. More specifically, the MTA 30 includes a routing module 47, a PSTN interface 54, a WAN network interface 44, a bandwidth management module 48, a Dynamic Host Configuration Protocol (DHCP) server 61, and a local area network interface 52.

The WAN network interface 44 utilizes known physical layer protocols which are compliant with those utilized by a communication link interface 36 of the access module 26 such that IP frames may be exchanged between the routing module 47 and the access module 26 over the communication link 34. A more detailed discussion of the WAN network interface 55 is included later herein.

The LAN interface module 52 comprises one or more network ports 53a and 53b, each for enabling the exchange of IP frames between the routing module 47 and one of the clients 58a-58b. In the exemplary embodiment, the LAN interface module 52 may operate as an Ethernet switch and each network port 53a and 53b provides an Ethernet compliant downlink connection for one of the data clients 58a or 58b.

The DHCP server 61 is a known server technology that dispenses IP addresses (from within a subset of IP addresses that are reserved for local area network use). The DHCP server 61 dispenses a local area network IP address to each of the data clients 58a and 58b.

The PSTN interface 54 emulates a PSTN subscriber loop on each of a plurality of PSTN ports 55 for interfacing with a traditional PSTN device 32 utilizing in-band analog or digital PSTN signaling. The PSTN interface 54 further includes a VoIP client 60 which provides VoIP signaling and compressed audio media exchange with remote VoIP devices such as the soft switch 27 and the PSTN gateway 24. The VoIP client 60 comprises a port selection module 53, a signaling or call set up module 31, a compression module 33, and a framing module 56—each of which is discussed in more detail herein. An audio DSP 65 interfaces between the VoIP client 60 and each of the PSTN ports 55.

Routing Module

Figure 2A:
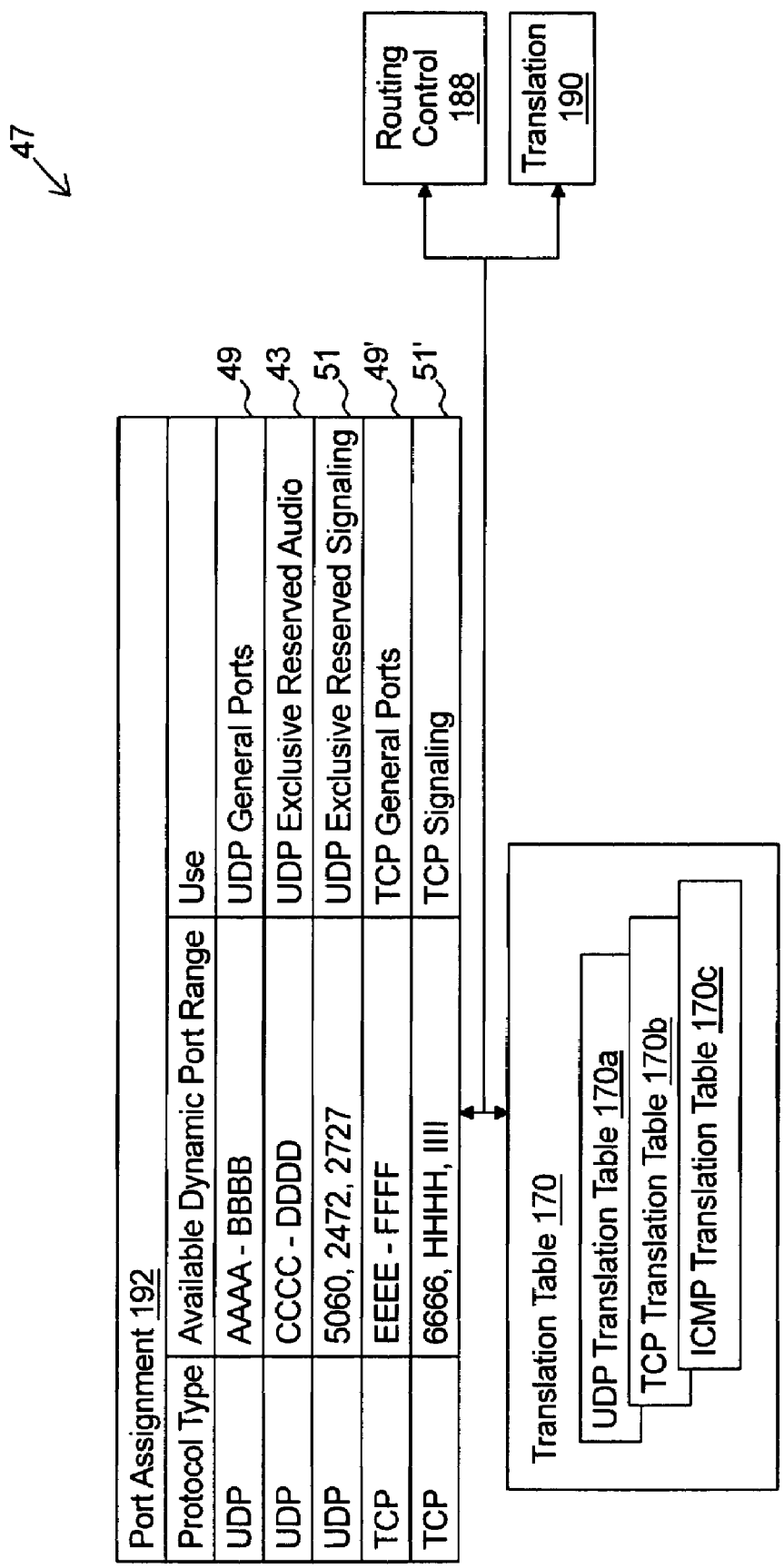
FIG. 2a is a block diagram of a routing module in accordance with one embodiment of the present invention.

Referring to FIG. 2a in conjunction with FIG. 1, the routing module 47 operates as a root node of the local area network IP network 28 and provides network address and port translation services to enable each of the multiple data clients 58a and 58b (and the VoIP module 60) to share only a single IP address assigned to the MTA 30 by the service provider for the exchange of TCP/IP frames, UDP/IP frames and ICMP/IP frames with other internet devices.

Port translation services for UDP frames are provided utilizing only a limited first subset (referred to as UDP translation ports 49) of the port numbers generally available for UDP port assignment. Port translation services for TCP frames are provided utilizing only a limited first subset (referred to as TCP translation ports 49') of the port numbers generally available for TCP port assignment.

Generally, UDP dynamic ports and TCP dynamic ports are available to be dynamically assigned for the exchange of data between applications utilizing either a UDP/IP channel or a TCP/IP connection respectively. As such, the translation ports 49 utilized by the routing module 47 are only a fraction of the generally available dynamic ports. For purposes of illustration, UDP translation ports 49 may consist of only those port numbers between AAAA and BBBB and TCP translation ports 49' may consist of only those port numbers between EEEE and FFFF.

A second subset of the generally available UDP ports (referred to as reserved audio ports 43) (in this example, ports CCCC through DDDD) are reserved exclusively for use by the VoIP client 60. As such, UDP/IP frames exchanged between the VoIP client 60 and a remote VoIP device (such as the soft switch 27 and the PSTN gateway 24) using one of the reserved audio ports 43 may be passed through the routing module 47 without port translation.

A third subset of the generally available UDP ports (referred to as UDP reserved signaling ports 51) (in this example, ports 5060, 2472, and 2727) are reserved exclusively for use by the VoIP client 60 for UDP call signaling. As such, IP frames exchanged between the VoIP client 60 and a remote VoIP device using one of the reserved UDP signaling ports 51 may be passed though the routing module 47 without port translation.

Similarly, a subset of the generally available TCP ports (referred to as TCP reserved signaling ports 51') (in this example, ports GGGG, HHHH, and IIII) are reserved exclusively for use by the VoIP client 60 for TCP call signaling. As such, IP frames exchanged between the VoIP client 60 and a remote VoIP device using one of the reserved TCP signaling ports 51' may be passed though the routing module 47 without port translation.

It should be appreciated that port partitioning enables a single IP address to be shared by the VoIP client 60 and each of the data clients 58a-58b. In the above described partitioning example, each of the subsets of translation ports 49 and 49', reserved audio ports 43, are represented by a contiguous block of port numbers. However, it should be appreciated that each subset may comprise a non-contiguous group of ports assigned to the subset on either a static or dynamic basis.

Further, the subset of reserved signaling ports 51 and 51' are represented by a set of discrete port numbers know to be used by popular VoIP signaling systems. However, it should be appreciated that each subset 51 and 51' may comprise a contiguous or non-contiguous block of ports assigned to the subset on either a static or dynamic basis.

The routing module 47 comprises a routing control module 188, a translation module 190, a port assignment table 192, and translation tables 170. In combination, the routing control module 188 and the translation module 190 route outbound frames (e.g. frames received from either one of the data clients 58a-58b or the VoIP module 60) to the access module 26 and route inbound frames (e.g. frames received from the access module 26) to the applicable one of the data clients 58a-58b and the VoIP module 60. Further, the routing module 47 provides port and address translation for the multiple data clients 58a-58b while routing VoIP frames between the VoIP module 60 and the access module 26 without port translation.

The description herein focuses on two embodiments of the present invention. In the first embodiment, the VoIP client 60 utilizes the global IP address assigned to the MTA 30 by the service provider. In the first embodiment, UDP/IP frames exchanged between the VoIP client 60 and the access module 26 utilizing one of the reserved audio ports 43 or the reserved signaling ports 51 will be passed through the routing module 47 without port translation or IP address translation.

In the second embodiment, the VoIP client 60 utilizes a non-globally unique IP address assigned by the DHCP server 61 (or otherwise assigned from the subset of IP addresses reserved for local area network use). In the second embodiment UDP/IP frames exchanged between the VoIP client 60 and the access module 26 utilizing one of the reserved audio ports 43 or the reserved signaling ports 51 will be passed through the routing module 47 with IP address translation only and without port translation.

Translation of Outbound Frames

Figure 3A:
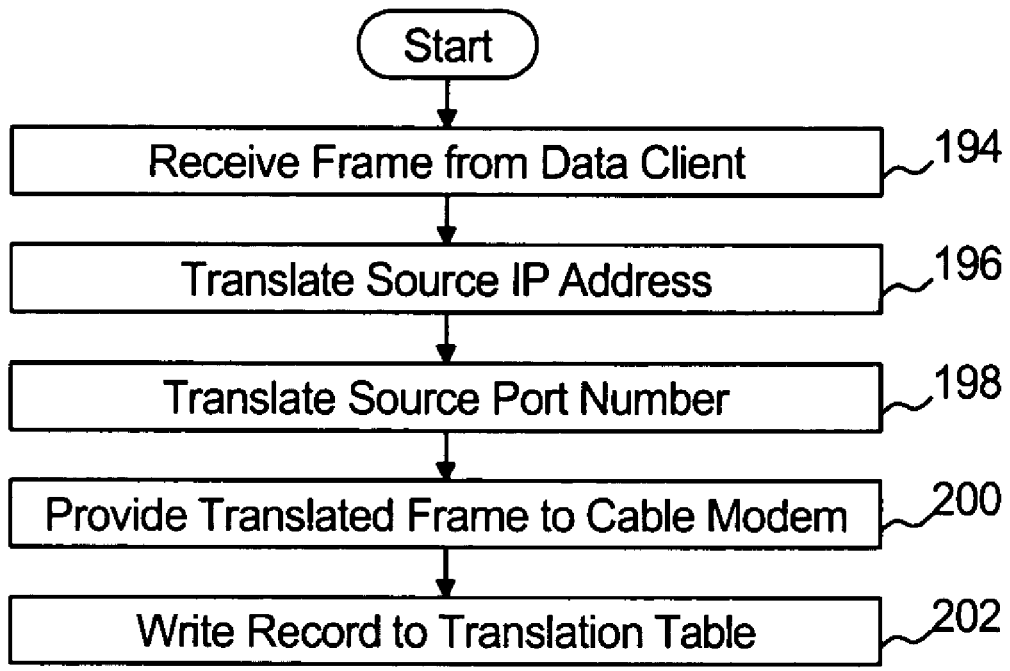
FIGS. 3a through 3c are flow charts, each representing exemplary operation of the routing module of FIG. 2.
Figure 10:
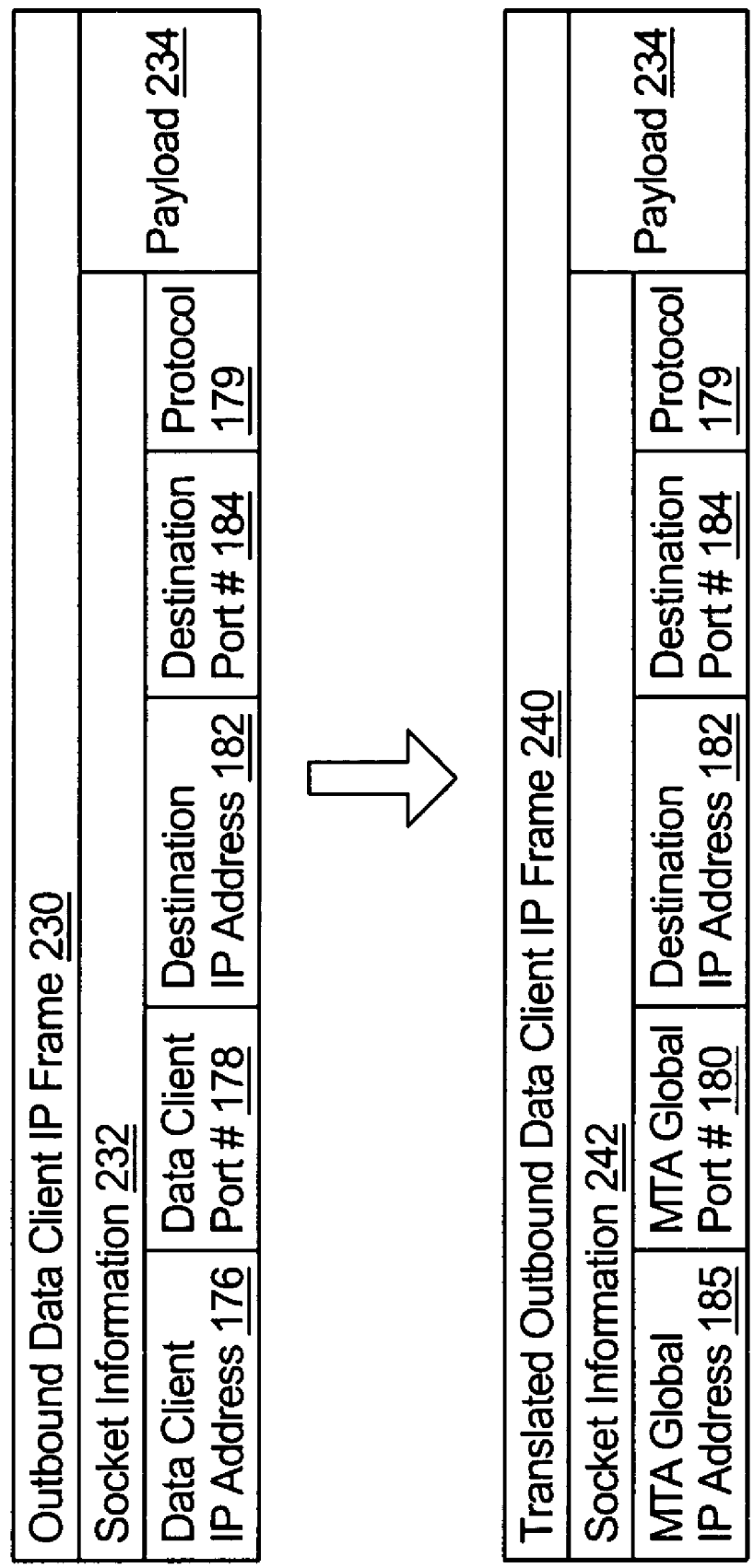
FIG. 10 is a block diagram representing outbound data client IP frame address and port translation.

Referring to the flow chart of FIG. 3a in conjunction with FIGS. 2a and 2b and the partial IP frame diagrams of FIG. 10, exemplary steps performed by the routing module 47 in response to receiving an outbound data client IP frame 230 (e.g. a frame with a destination IP address 182 (discussed later) outside the block of IP addresses assigned on the local area network by the DHCP server 61) from one of the data clients 58a-58b are represented.

The outbound data client IP frame 230 will include socket information 232 which include the data client's local area network IP address as assigned by the DHCP server 61 (referred to as the data client IP address 176), the protocol type 179 (either TCP, UDP, or ICMP), the TCP or UDP port assigned by the data client to the specific application generating the payload data of the frame 230 (referred to as the data client port number 178) if the frame is TCP or UDP type, and other socket information such as a destination IP address 182, which is the global IP address to which the data client 58 address the outbound frame 230, a destination port number 184 which is the TCP or UDP port of the destination computer to which the data client 58 addressed the outbound frame, and an ICMP type identifier and a sequence number if the IP frame 230 is ICMP type.

Step 194 represents the routing control module 188 receiving the IP frame 230 from the data client.

Steps 196 and 198 represent the translation module 190 translating the outbound data client IP frame 230 into the translated outbound data client IP frame 240. More specifically, step 196 represents the translation module 190 replacing the data client IP address 176 with the global IP address assigned to the MTA 30 by the service provider (referred to as the MTA global IP address 185).

Step 198 applies to TCP and UDP type frames and represents the translation module 190 replacing the data client port number 178 with a port number selected from the subset of UDP translation ports 49 if the protocol type 179 indicates that the frame is UDP or replacing the data client port number 178 with a port number selected form the subset of TCP translation ports 49' if the protocol type 170 indicates that the frame is TCP.

The port number selected to replace the data client port number 178 is referred to as the MTA general port number 180. More specifically, the translation module 190 queries the port assignment table 192 to select an MTA general port number 180 from the subset of translation ports 49 or 49' as described in the preceding paragraph and then replaces the data client port number 178 with the selected MTA general port number 180.

Step 200 represents the routing control module 188 providing the translated frame 240 to the access module 26.

Step 202 represents the translation module 190 recording the translation in the appropriate translation table 170a, 170b, or 170c. Or, stated more specifically, step 202 represents the translation module recording a UDP/IP frame translation in the UDP translation table 170a, recording a TCP/IP frame translation in the TCP translation table 170b, and recording a ICMP/IP frame translation in the ICMP translation table 170c. Each translation tables 170a and 70b includes a plurality of records 172, each of which represents local IP socket information 175 and global IP socket information 177.

Record "1" in each of the translation tables 170a and 170b represents a recording of the translation of an outbound data client IP frame 230. The local IP socket information 175 comprises: i) a source address which is the data client IP address 176; ii) a source port number which is the data client port number 178; iii) the destination IP address 182; and iv) the destination port number 184. The global IP socket information 177 comprises: i) the MTA global IP address 185; ii) the MTA general port number 180; iii) the destination IP address 182; and iv) the destination port number 184.

It should be noted that the destination IP address 182 and the destination port number 184 are included in both the local IP socket information 175 and the global IP socket information 177 and would not require entry in the table twice. The tables of FIG. 2b show the duplicate entry for clarity only.

It should also be noted that if the MTA 30 is assigned only one globally unique IP address by the service provider, then there is no need to enter the MTA global IP address 185 in table. Again, the tables of FIG. 2b show the entry for clarity.

The time out field 186 includes a value representing a duration of time during which the routing module 47 will reverse translate frames before closing the connection.

Record "1" in the translation tables 170c represents a recording of the translation of an outbound data client ICMP frame 230. The table 170c comprises: i) a source address which is the data client IP address 176; ii) the destination IP address 182; iii) a sequence number 187; iv) an ICMP frame type 189, and v) the MTA global IP address 185.

Figure 3B:
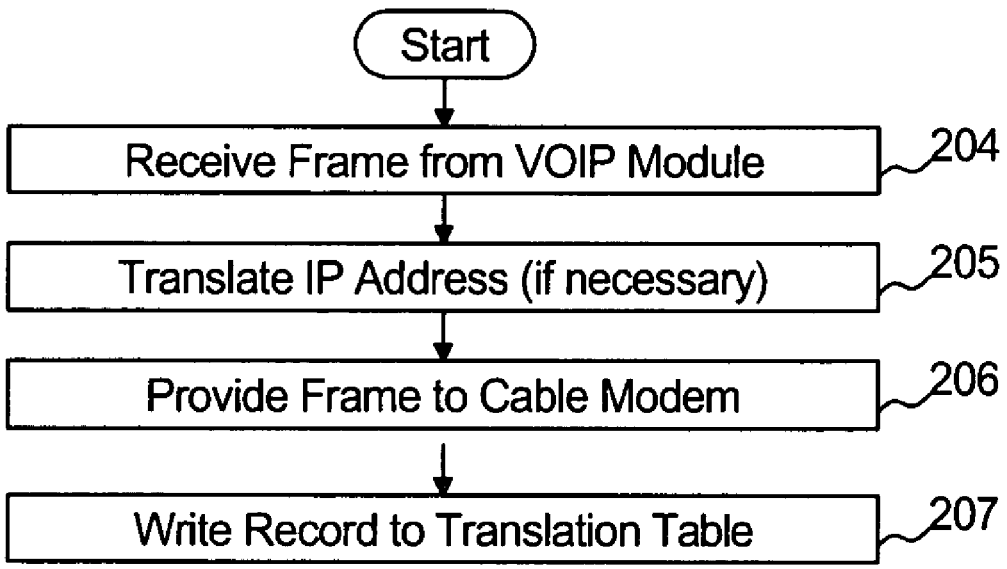
Figure 11:
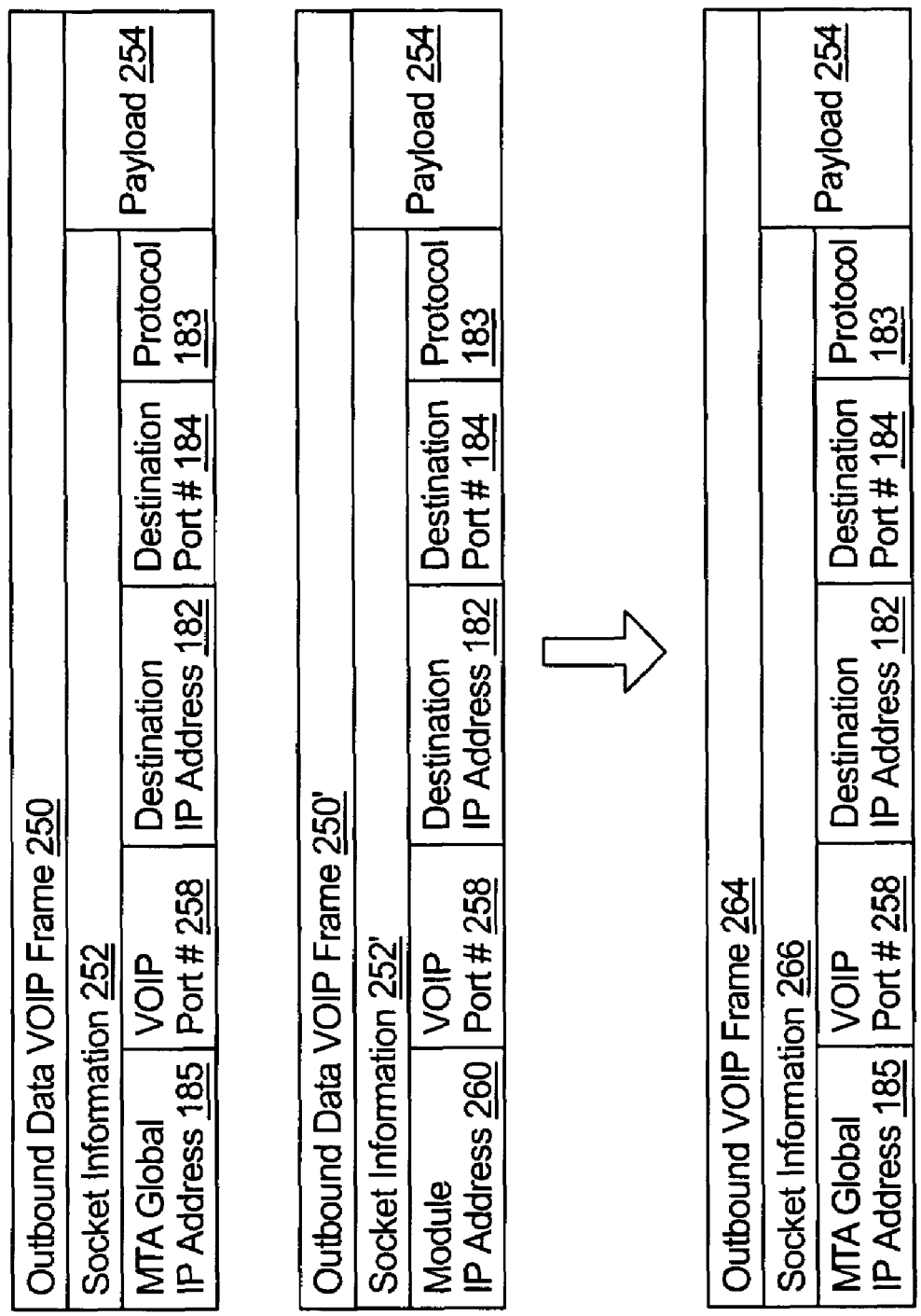
FIG. 11 is a block diagram representing exemplary outbound VoIP IP frame IP address only translation.

Referring to the flow chart of FIG. 3b in conjunction with FIGS. 2a and 2b and the partial IP frame diagrams of FIG. 11, exemplary steps performed by the routing module 47 in response to receiving an outbound VoIP frame 250 or 250' from the VoIP client 60 are shown.

The outbound VoIP frame 250 represents the first embodiment wherein the VoIP module 60 utilizes the global IP address of the MTA 30 and is refereed to as a first embodiment VoIP frame 250.

The outbound VoIP frame 250' represents the second embodiment wherein the VoIP module 60 utilizes a non-globally unique IP address reserved for use on a local area network. The outbound VoIP frame 250' is referred to herein as a second embodiment VoIP frame 250'

The first embodiment outbound VoIP frame 250 will include payload 254 and socket information 252. The socket information 252 includes the MTA global IP address 185 of the MTA 30, a VoIP port number 258 selected from the subset of reserved UDP audio ports 43, the protocol type 183 (which in the case of a VoIP frame will be UDP), and other socket information such as a destination IP address 182, which is the global IP address to which the VoIP module 60 addressed the outbound frame 230, and a destination port number 184 which is the UDP port number of the destination computer to which the VoIP module 60 addressed the outbound frame.

The second embodiment outbound VoIP frame 250' will include the payload 254 and socket information 252'. The socket information 252' includes a module IP address 260 (which is the local network IP address that has been assigned to the VoIP module 60), a VoIP port number 258 selected from the subset of reserved UDP audio ports 43, the protocol type 183 (which in the case of a VoIP frame will be UDP) and other socket information such as the destination IP address 182 and the destination UDP port number 184. The module IP address 260 may be a fixed local area network IP address permanently assigned to the VoIP module 60 or may be an address assigned by the DHCP module 61.

Step 204 of the flowchart represents the routing control module 188 receiving the outbound frame 250 or 250' from the VoIP module 60. If the first embodiment VoIP frame 250 is received, neither address translation nor port translation is necessary nor performed and step 206 represents providing the frame (as received from the VoIP module 60) to the access module 26.

Alternatively, if the second embodiment VoIP frame 250' is received, address translation is necessary and step 205 represents performing only address translation (while port translation is not performed) to translate the source IP address 176 to the MTA global IP address 185 as represented by the address only translated outbound VoIP frame 264. Step 206 represents providing the address only translated outbound VoIP frame 264 to the access module 26.

Step 207 represents the translation module recording the local IP socket information 175 and the global IP socket information 177 in the UDP translation table 170a. Record "2" represents recording the translation (or lack of translation) of a first embodiment outbound VoIP frame 250. The local IP socket information 175 comprises: i) a source IP address which is the MTA global IP address 185 (because the VoIP module 60 uses the global IP address assigned to the MTA 30 by the service provider); ii) a source port number which is the VoIP port number 258; iii) the destination IP address 182; and iv) the destination port number 184. The global IP socket information 177 comprises: i) the MTA global IP address 185; ii) the VoIP port number 258; iii) the destination IP address 182; and iv) destination port number 184.

Record 3 represents recording the IP address only translation of a second embodiment outbound VoIP frame 250'. The local IP socket information 175 comprises: i) the module IP address 260; ii) the VoIP port number 258; iii) the destination IP address 182; and iv) the destination port number 184. The global IP socket information 177 comprises: i) the MTA global IP address 185; ii) the VoIP port number 258; iii) the destination IP address 182; and iv) the destination port number 184.

Because it is possible that the VoIP client 60 may generate ICMP frames, the ICMP translation table 170c further may include records 2 and 3 which represent outbound translation of an ICMP frame generated in the first embodiment of the present invention and the second embodiment of the present invention respectively.

Record 2, representing the first embodiment includes: i) a source IP address which is the MTA global IP address 185, ii) the destination IP address 182; iii) a sequence number 187; iv) an ICMP frame type 189, and v) the MTA global IP address 185. Record 3, representing the second embodiment includes: i) a source IP address which is the module IP address 260, ii) the destination IP address 182; iii) a sequence number 187; iv) an ICMP frame type 189, and v) the MTA global IP address 185.

Reverse Translation

When the MTA 30 receives an IP frame from the access module 26, the MTA must deliver such frame to one of the signaling module 31 or the compression module 33 of the VoIP client 60 without port translation, or to reverse translate such frame for delivery to one of the data clients 58a-58b.

Figure 3C:
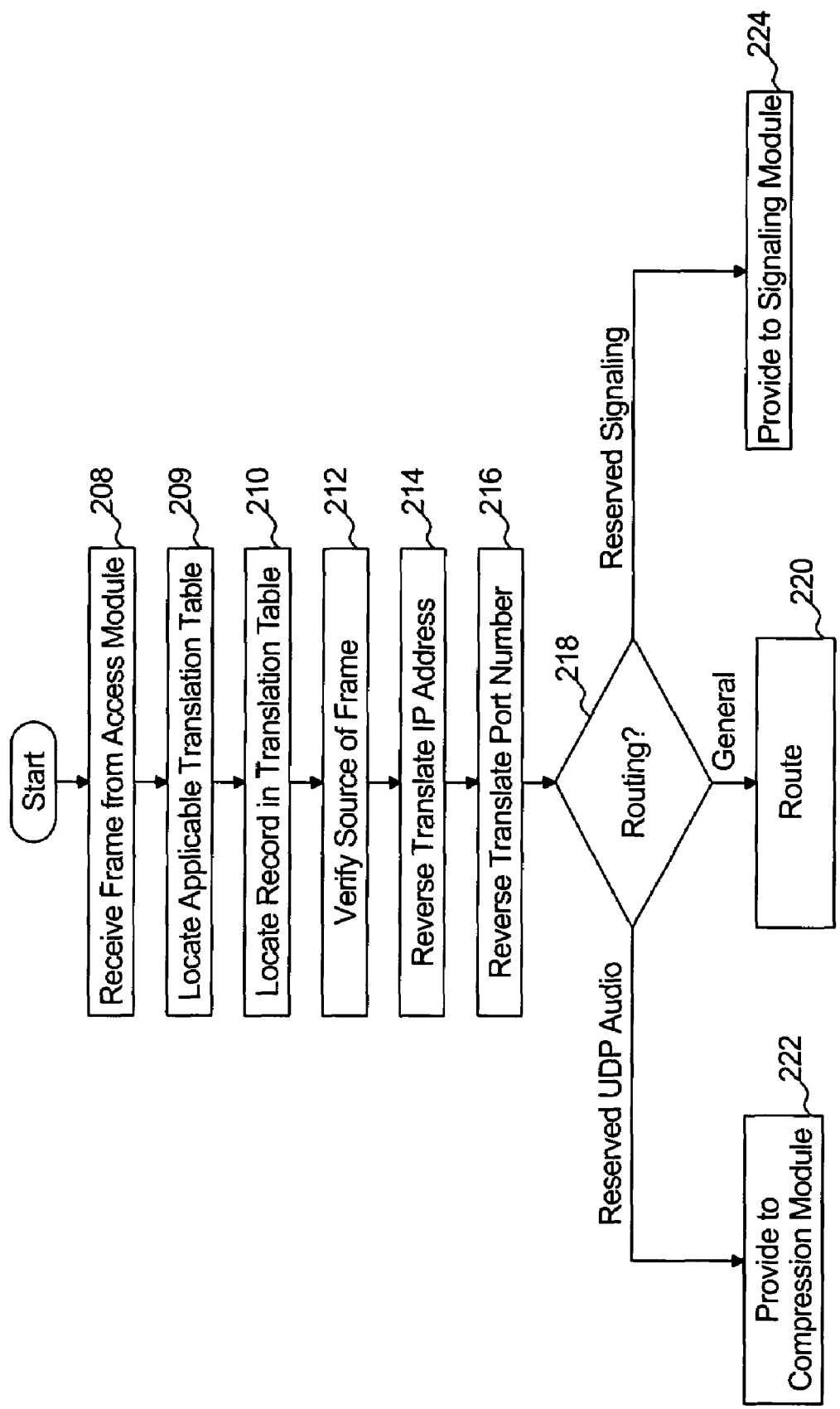
Figure 12:
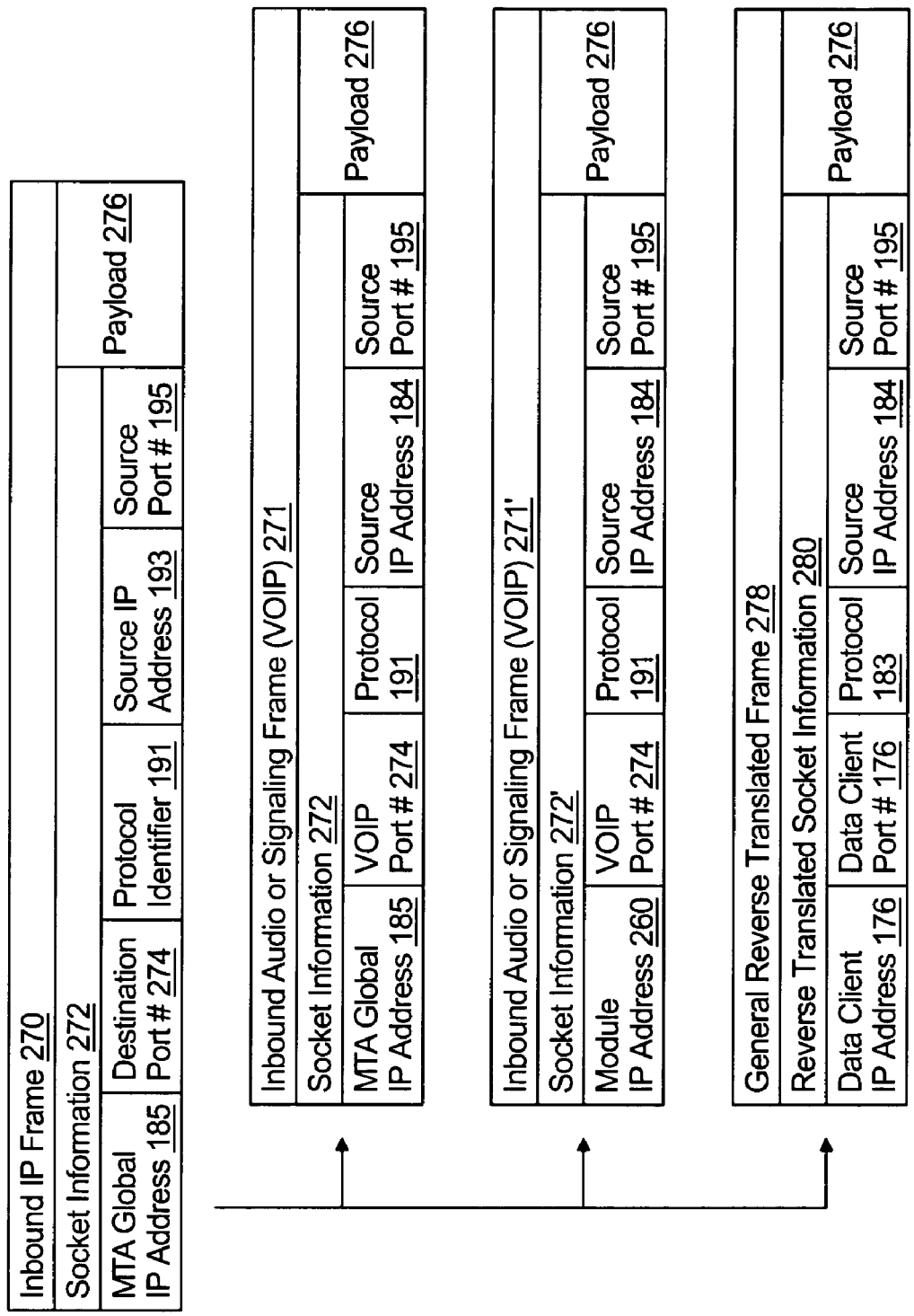
FIG. 12 is a block diagram representing inbound IP frame routing.

Referring to the flow chart of FIG. 3c in conjunction with the partial frame diagrams of FIG. 12, exemplary steps performed by the routing module 47 in response to receiving an inbound frame 270 from access module 26 addressed to the global IP address of the MTA 30 are shown.

Step 208 represents the routing control module 188 receiving the inbound IP frame 270. The inbound IP frame 270 may comprise socket information 272 and may comprise payload 276. The socket information 272 includes a destination address which is the MTA global IP address 185. The MTA global IP address is the address that enabled the IP frame 270 to be routed to the MTA 30 over the internet. The socket information 272 further comprises: a destination port number 274, a protocol type identifier 191; a source address 193 (which will be the IP address of the remote computer generating the inbound IP frame 270); and a source port 195 which will be the port number assigned by the remote computer.

If the protocol type identifier 191 indicates that the inbound frame 270 is a UDP/IP frame, then the destination port number 274 may be within any of the: i) subset of UDP translation port numbers 49, ii) subset of reserved audio ports 43, and iii) subset of UDP reserved signaling ports 51.

If the protocol type identifier 191 indicates that the inbound frame 270 is a TCP/IP frame, then the destination port number 274 may be within any of the: i) subset of TCP translation port numbers 49' or ii) subset of TCP reserved signaling ports 51'.

If the protocol type identifier 191 indicates that the inbound frame 270 is an ICMP/IP frame, then there is no port information.

Step 209 represents determining which one of the translation tables 170a, 170b, and 170c should be used for reverse translation. More specifically, if the protocol identifier 191 indicates that the frame is UDP/IP, then the UDP translation table 170a is selected at step 209. If the protocol type identifier 191 indicates that the frame is TCP/IP, then the TCP translation table 170b is selected at step 209. If the protocol type identifier 191 indicates that the frame is ICMP/IP, then the ICMP translation table 170c is selected at step 209.

Step 210, in the case of TCP and UDP frames, represents locating a record 172 in the selected translation table that includes the destination port number 274 from the received frame 270 in the port number field of the global IP socket information 177.

Step 210, in the case of ICMP frames, represents locating a record 172 in the ICMP translation table 170c that includes the ICMP frame type 189 and sequence number 187 from the received frame 270 in the appropriate fields of the ICMP translation table 170c.

Step 212 represents verifying the source of the frame by comparing the source IP address 193 and source port number 195 of the received frame 270 to the destination IP address 182 and the destination port number 184 of the global IP socket information 177. Step 212 is performed for security purposes of assuring that the inbound frame is truly a response to a frame previously sent by the MTA 30. If there is no match, the inbound frame is discarded without routing.

Step 214 represents reverse translating the IP address of the frame 270 (if necessary). More specifically, at step 214 the MTA global IP address 185 of the destination address field 272 of the received frame 270 is replaced with the source IP address of the local socket information 175 which may be: i) a data client IP address 176 as represented by record 1 of any of the translation tables 170a, 170b, or 170c; ii) a module IP address 260 as represented by record 3 of the UDP translation table 170b; or iii) the MTA global IP address 185 as represented by record 2 (which really is not a translation) of the UDP translation table 170b.

Step 216 represents reverse translating the destination port number of the frame 270 (if necessary). More specifically, in the case of TCP and UDP frames, the destination port number 274 of the received frame 270 is replaced by the source port number of the local IP socket information 175 which may be a data client port number 178 if the destination port number is within the block of UDP general ports 49, as represented by record 1 of the UDP translation table 170a or TCP general ports 49' as represented by record 1 of the TCP translation table 170b. It should be appreciated that in the case of an ICMP frame, no port data exists and therefore no port translation can be performed.

If the destination port number 274 is within any of the blocks of UDP exclusive reserved audio ports 42, UDP exclusive reserved signaling ports 51, or TCP exclusive reserved signaling ports 51', then port translation is not performed.

It should be appreciated that in the first embodiment of the invention, an inbound frame 270, which includes a destination port number within any of the blocks of UDP reserved audio ports 42, UDP reserved signaling ports 51, or TCP reserved signaling ports 51', will not undergo any IP address translation or port translation as represented by the first embodiment audio or signaling frame 271.

In the second embodiment of the invention, an inbound frame 270 which includes a destination port number within any of the blocks of UDP reserved audio ports 42, UDP reserved signaling ports 51, or TCP reserved signaling ports 51', will undergo IP address translation but will not undergo any port translation as represented by the first embodiment audio or signaling frame 271'.

In either embodiment, an inbound frame 270 (whether UDP type or TCP type) that includes a destination port number 274 within either the block of UDP general ports 49 or TCP general ports 49' will undergo both IP address translation and port translation as represented by the general translated frame 278.

Step 218 represents determining whether the inbound frame 270 should be routed to the signaling module 31 of the VoIP module 60, the compression module 33 of the VoIP module 60, or to one of the data clients 58a or 58b.

More specifically, if the destination port number 274 is within one of the blocks of UDP reserved signaling ports 51 or TCP reserved signaling ports 51', then the frame 271 or 271' is routed to the signaling module 31 at step 224. If the destination port number 274 is within the block of UDP reserved audio ports 43, then the frame 271 or 271' is routed to the compression module 33 at step 222. If the destination port number 274 is within one of the blocks of UDP general ports 49 or one of the TCP general ports 49' then the reverse translated frame 278 is routed using the local are network socket information of the reverse translated frame at step 220.

PSTN Interface Module

The PSTN interface module 54 comprises the VoIP client 60, the plurality of PSTN ports 55, a PSTN signal driver module 63, and an audio DSP 65.

The PSTN driver module 63 emulates a PSTN subscriber loop on each PSTN port 55 for interfacing with a traditional PSTN device 32 utilizing in-band analog or digital PSTN signaling. The audio DSP 65 interfaces between the PSTN driver module 63 and the VoIP client 60. The Audio DSP 65: i) detects PSTN events on the PSTN port 55 such as Off Hook, On Hook, Flash Hook, DTMF tones, Fax Tones, TTD tones; ii) generates PSTN signaling such as Ring, Dial Tone, Confirmation Tone, CAS Tone and in band caller ID; and iii) converts between PSTN audio media and digital audio media. The audio DSP 65 also provides echo cancellation and conference mixing of digital audio signals.

As discussed, the VoIP client 60 comprises a signaling translation module 31, a port selection module 53, a compression/decompression module 33, and a framing module 56 which, in combination, convert between: i) call signaling messages and digital audio media exchanged with the audio DSP 65 and ii) VoIP signaling and compressed audio media exchanged with remote VoIP devices such as the soft switch 27 and the PSTN gateway 24 via the communication link 34, the network 12, and the managed IP network 24.

The signaling translation module 31 converts between call signaling messages exchanged with the audio DSP 65 and the VoIP call signaling messages exchanged with the remote VoIP devices utilizing reserved UDP signaling ports 51 or TCP signaling ports 51'.

The compression/decompression module 33 operates algorithms which convert between the digital audio media exchanged with the audio DSP 65 and the compressed digital audio that may be transmitted over UDP/IP channels between the VoIP client 60 and a remote VoIP device utilizing a reserved audio port 43. Exemplary compression/decompression algorithms utilized bye the compression/decompression module 33 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G.729E.

The framing module 56 utilizes time division logical channel parameters (discussed later herein) to encapsulate compressed digital audio data into outbound VoIP frames with a payload size that is most suitable to the time division logical channel over which the access module 26 will transmit such frames on the network 12. More specifically, the framing module 56 will encapsulate the compressed digital audio data into IP frames with a payload size that is less than or equal to the frame size limitation of the channel and a quantity of frames that, over a period of time, will not exceed the frame frequency limitation of the channel.

Figure 9:
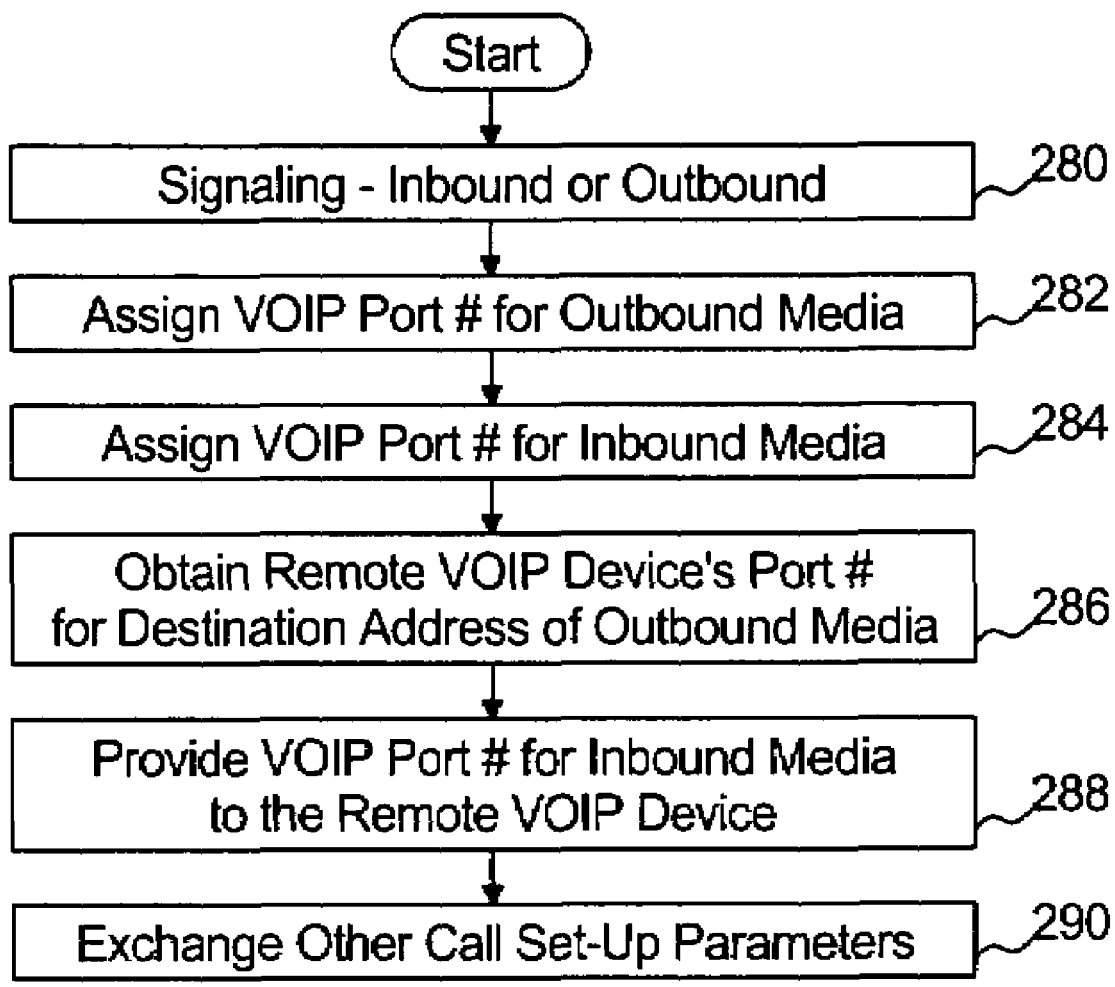
FIG. 9 is a flow chart representing exemplary VoIP session set up steps.

The port selection module 53 manages usage of the reserved audio ports 43. In particular, the port selection module 53 assigns port numbers to the various UDP/IP channels that may be established by the signaling module 31 during set up of a VoIP session. More specifically, referring to the flow chart of FIG. 9, exemplary steps performed by the port selection module 53 and the signaling module 31 in establishing an inbound or outbound VoIP call are represented.

Step 280 represents performing inbound or outbound call signaling with a remote VoIP device. In exemplary embodiments, the call signaling may include both sending and receiving IP frames containing messages compliant with the SIP protocols, MGCP protocols, or the ITU H.323 protocols. Each such IP frame sent will have a UDP source port number selected from the subset of UDP reserved signaling ports 51 or a TCP source port number selected from the subset of TCP reserved signaling ports 51'. Each frame received will have a destination port number within the subset of UDP reserved signaling ports 51 or TCP reserved signaling ports 51'. As such, the router module 47 will pass each such frame between the VoIP module 60 and the access module 26 without port translation as previously discussed.

Step 282 represents assigning a VoIP port number for an outbound media stream. More specifically, the port selection module 53 selects an outbound port number from the subset of reserved audio ports 43.

Step 284 represents assigning a VoIP port number for an inbound media stream. More specifically, the port selection module 53 selects an inbound port number from the subset of reserved audio ports 43.

Step 286 represents obtaining a port number of the remote device for use in a destination address field of each frame of the outbound media session. The remote device will assign a port number on which the remote device will receive the media stream. The VoIP client 60 must address each frame of the outbound media session to the remote device utilizing such assigned port number.

Step 288 represents providing the VoIP port number selected at step 284 (for the inbound media stream) to the remote device. This step enables the remote device to send each frame of the inbound media stream addressed to the selected port number thereby enabling each such frame sent by the routing module 47 to the VoIP module 60 without reverse translation. Each of steps 286 and 288 may be performed utilizing any of the SIP, MGCP, or ITU H.323 protocols.

Step 290 represents the exchange of other call set-up parameters and/or media settings necessary to establish the inbound and outbound media channels.

WAN Network Interface and Bandwidth Management

The WAN network interface 44 utilizes known physical layer protocols which are compliant with those utilized by a communication link interface 36 of the access module 26 such that frames may be exchanged between the MTA 30 and the access module 26 over the communication link 34. In an exemplary embodiment, the access module is a DOCSIS compliant cable modem, each of the WAN network interface 44, the communication link interface 36, and the communication link 34 may comply with a known communication standards such as USB or Ethernet.

The WAN network interface comprises a datalink layer router 45. The data link router 45 operates to deliver bandwidth management frames (discussed later herein) received from the access module 26 to the bandwidth management modules 48 while routing IP traffic received from the access module 26 to the network layer router 47. The datalink layer router 45 utilizes the EtherType field for routing.

The bandwidth management module 48 is responsible for assuring that the access module 26 properly interfaces with the network controller 20 to establish and maintain time division logical channels over the network 12 to support each VoIP session between the VoIP client 60 and a remote VoIP device. In particular, the bandwidth management module provides bandwidth management instructions to the access module 26 and receives bandwidth management frames from the access module 26 which in combination operate to instruct the access module 26 to utilize known DOCSIS DQoS messaging with the network controller 20 to reserve, commit, and release applicable time division logical channels over the network 12.

Figure 4:
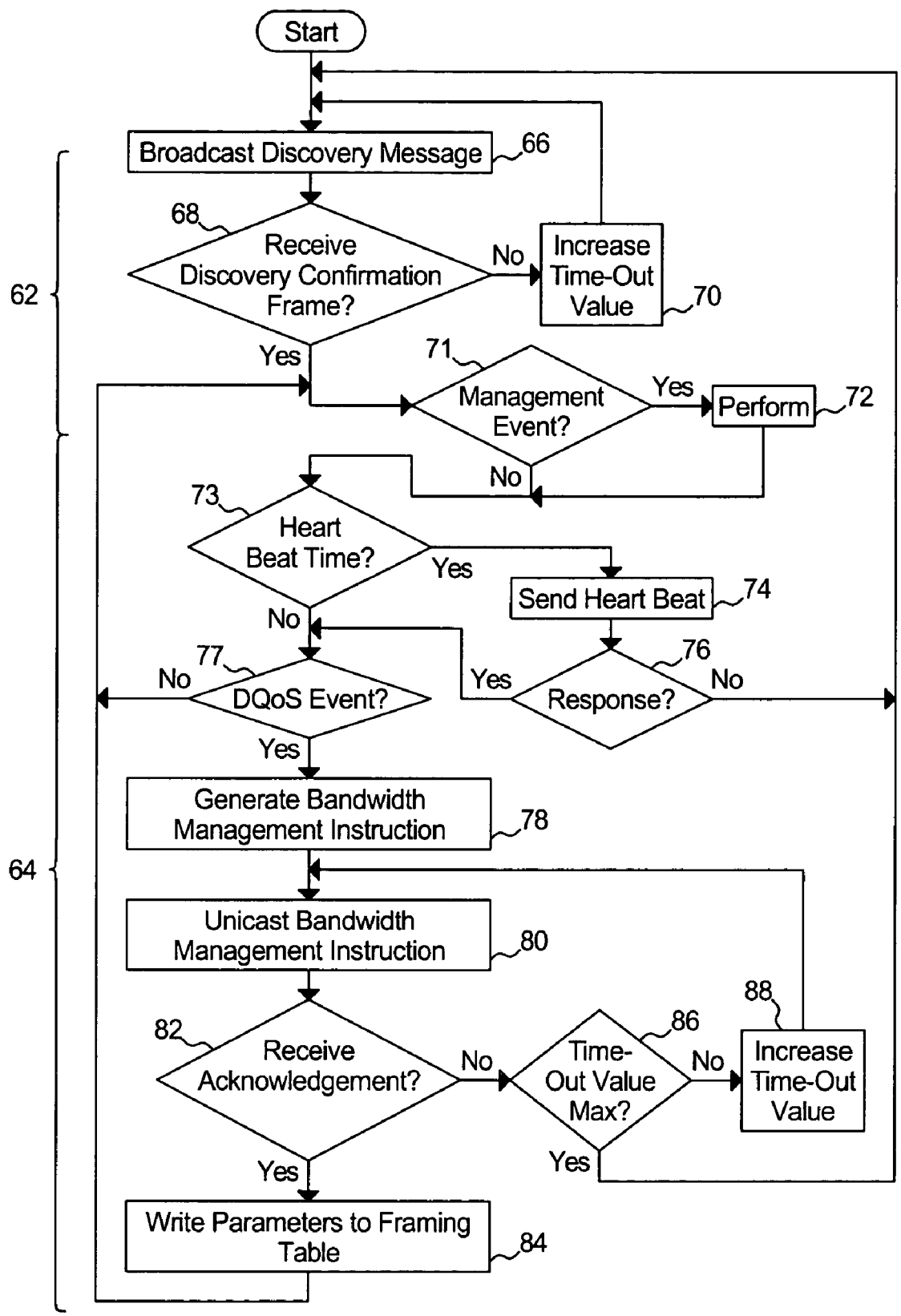
FIG. 4 is a flow chart representing exemplary operation of a bandwidth management module in accordance with one embodiment of the present invention.

The bandwidth management module 48 comprises a discovery module 35 and a bandwidth control state machine 37. The discovery module 35 is responsible for establishing a data link layer session between the bandwidth management module 48 and a QoS application 42 of the access module 26. In the exemplary embodiment, the session is established using discovery processes similar to those utilized by the point-to-point over Ethernet (PPOE) standard. Exemplary operation of the discovery module 35 is represented by the steps included within the discovery phase 62 of the flow chart of FIG. 4.

Step 66 represents broadcasting a discovery frame on the link 34 between the MTA 30 and the access module 26. In the exemplary embodiment, the EtherType field of the Ethernet header of the discovery message has a value of "0xAA01" which assures that the frame will be routed to the QoS module 42 by a datalink router 41 of the access module 26.

It should be appreciated that because the discovery frame is a broadcast frame, there is no need for identification of the MAC address of the access module 26 in the discovery frame. This alleviates any requirement for inputting a MAC address of the access module 26 into the MTA 30 prior to initiating the discovery frame at step 66. It should also be appreciated that a MAC address of the MTA 30 will be included in the discovery frame as a source address. This enables the access module 26 to address a response to the MTA 30 as a unicast message.

Step 68 represents determination if a discovery session-confirmation frame has been received by the MTA 30 within time-out period. If a discovery session-confirmation frame has not been received within the time-out period, the timeout period is increased at step 70 and a new discovery message is broadcast at step 66. In the exemplary embodiment, the time-out period is doubled from an initial time out period of 200 ms each time step 68 is encountered—up until a maximum time out value of 2 seconds.

The discovery session-confirmation frame from the access module 26 is a frame that is unicast by the access module 26 to the MTA 30 using the MAC address of the access module 26 as a source address and includes the session ID established by the access module 26.

It should be appreciated that the exchange of the discovery frame and the discovery session-confirmation frame between the MTA 30 and the access module 26 provides for the exchange of MAC addresses and for establishing a session ID that may be used for all communications between the bandwidth management module 48 of the MTA 30 and the QoS control module 42 of the access module 26 over the lifetime of the connection (e.g. from initial connection or boot up until the communication link is lost due to disconnection or reset of either the MTA 30 or the access module 26).

After completion of the discovery stage 62, the bandwidth management module 48 enters a session stage 64. In the session stage 64, the EtherType of the header of each frame has a value of "AxAA02" and the datalink router 41 of the access module 26 continues to route such frames to the QoS module 42.

During the session stage 64, the bandwidth management module 48 responds to management instructions received from the access module 26 (discussed later), monitors the session with "heart beat" messages sent to the access module 26 to assure that the session has not been interrupted, and sends bandwidth management instructions to the access module 26.

Steps 71 and 72 represent responding to management instructions received from the access module 26. Decision box 71 represents determining whether a management message has been received. Upon receipt, the appropriate steps are preformed at step 72.

Steps 73-76 represents monitoring the session with "heart beat" messages. More specifically, decision box 73 represents determining whether an appropriate time has elapsed from the previous "heart beat" message to send another "heart beat" message. If yes, a "heart beat" message is sent to the cable modem at step 74. Decision box 76 represents determining whether a manage message has been received in response to the "heart beat" message. If not, the bandwidth management module 48 will re-enter the discovery state 62 at step 66.

The bandwidth management instructions that the bandwidth management module 48 may send to the QoS control module 42 of the access module 26 for QoS control are: i) Dynamic Service Addition (DSA), ii) Dynamic Service Change (DSC), and Dynamic Service Delete (DSD)—all of which will be described in more detail below.

Decision box 77 represents determining whether a DQoS event has occurred. A DQoS event is an event that requires that a time division logical channel be established, changed, or deleted. Exemplary DQoS events comprise: an indication from the VoIP client 60 that a new channel must be reserved; an indication from the VoIP client 60 that a reserved channel must be committed; an indication from the VoIP client 60 that a reserved or committed channel must be changed to accommodate a higher or lower layer of traffic; or an indication from the VoIP client 60 that an existing channel can be released.

Following the occurrence of a DQoS event, step 78 represents generating the applicable bandwidth management instruction and step 80 represent unicasting bandwidth management instruction to the access module 26.

The decision box 82 represents determining whether an acknowledgement has been received from the access module 26 within time-out period. If an acknowledgement has not been received within the time-out period, decision box 86 represent a determination whether the time out period is at a maximum value. If not, the timeout period is increased at step 88 and a new bandwidth management instruction is unicast at step 80. If the time period is at maximum value, it can be assumed that the bandwidth management session has failed and the discovery phase 62 is repeated.

After an acknowledgement message is received at step 82, step 84 represents writing the discrimination ID (as sent by the bandwidth management module 48) and the time division logic channel parameters (as received in the acknowledgement) to the framing table 39 to be available to the VoIP client 60 for generating IP frames of an appropriate size and frequency.

Example Access Module—A Cable Modem

The access module 26 may be a cable modem and may include a DOCSIS interface 40, a QoS module 42, a service flow module 38, a datalink layer router 41, and a communication link interface 36.

The communication link interface 36 utilizes one of a plurality of known physical layer protocols for exchanging frames with the MTA 30 over the communication link 34. The frames transferred between the communication link 36 and the MTA 30 may be IP traffic (e.g. IP sessions between a data client 58 and a remote Internet server or VoIP signaling or media sessions between the VoIP client 60 and the PSTN gateway 24) or may be bandwidth management frames transferred between the MTA 30 and the QoS module 42.

The datalink layer router 41 routes bandwidth management frames to the QoS module 42 and routes IP traffic to the service flow module 38 based on the EtherType field of each frame received on the communication link 34.

The DOCSIS interface 40 utilizes the known DOCSIS protocols for communicating with the network controller 20 over the network 12. The communications may include exchanging IP frames that are part of IP sessions between the MTA 30 and a remote internet server (such as the Internet gateway 22, the soft switch 27, and the PSTN gateway 24) and DOCSIS-DQoS control commands between the access module 26 and the network controller 20.

The service flow module 38 includes buffers 39. The service flow module receives the IP traffic sent by the MTA 30 on the communication link 34 and receives frames representing DOCSIS_DQoS commands from the QoS module 42. All frames received by the service flow module 38 may be stored in buffers 39 and sorted such that each frame can be delivered to the DOCSIS interface 40 at a time applicable for transmission of the frame on the network 12 within the appropriate time division logical channel. The sorting is performed with reference to a service flow table 108 for identifying the various time division logical channels that currently exist between the access module 26 and the network controller 20 over the network 12 and a discrimination table 106 for identifying which frames are to be transmitted within which time division logical channels and a service flow table. Both tables will be discussed in more detail herein.

The QoS module 42 operates as a slave to the MTA 30 by receiving bandwidth management instructions from the MTA 30 and making appropriate DOCSIS_DQoS request to the network controller 20 in response to the bandwidth management instructions. Further, the QoS module 42 exchanges management information with the MTA 30 such as the "heart beat" messages and responses, time of day messages, DHCP ID messages, and Syslog ID messages.

Figure 5:
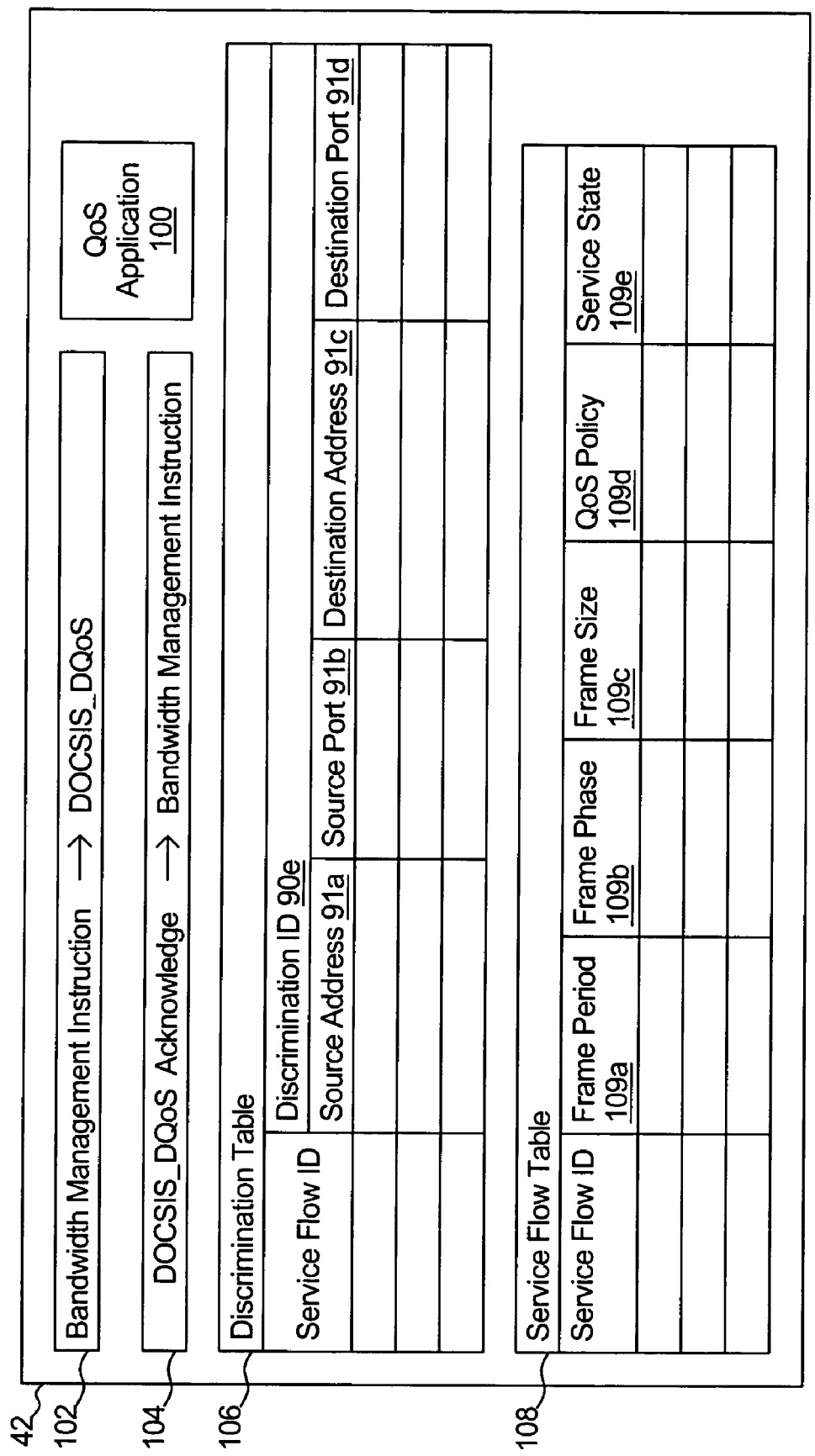
FIG. 5 is a block diagram of a dynamic quality of service module operating in an access module in accordance with one embodiment of the present invention.

Turning Briefly to FIG. 5, a block diagram on an exemplary QoS module 42 in accordance with the present invention is shown. The QoS module 42 comprises a bandwidth management instruction to DOCSIS_DQoS request conversion table 102; a DOCSIS_DQoS Acknowledge to bandwidth management acknowledge conversion table 104; the discrimination table 106, the service flow table 108, and a QoS application 100.

Figure 6:
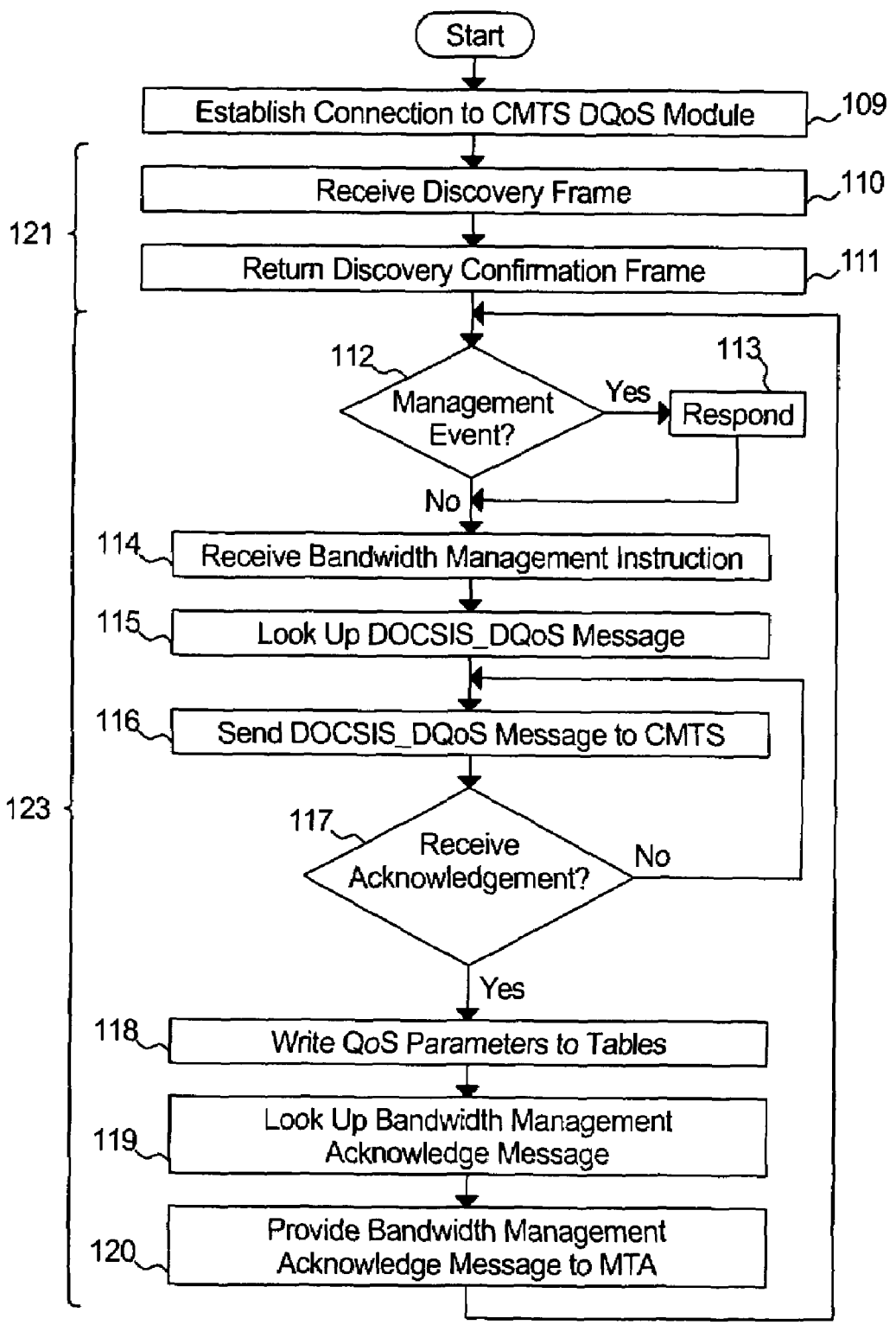
FIG. 6 is a flow chart representing exemplary operation of a dynamic quality of service application in accordance with one embodiment of the present invention.

Turning briefly to the flow chart of FIG. 6 in conjunction with FIGS. 1 and 5, exemplary operation of the QoS application 100 is shown. Step 109 represents establishing a connection to the CMTS utilizing known DOCSIS DQoS commands. Step 109 will typically be performed when the access module 26 is first powered up and connected to the network 12. Thereafter, steps 110 and 111 represent operation of the QoS application 100 in a discovery stage wherein a communication session with the MTA 30 is established. Steps 112-120 represent operation of the QoS application 100 in a session stage 123.

Step 110 represents receiving a broadcast discovery message from the MTA 30 that is routed to the QoS module 42 by the datalink layer router 41 because it includes an EtherType that distinguishes it from frames to be routed to the service flow module 38 (e.g. EtherType field 0xAA01). The MAC address of the MTA 30 will be included within the discovery message.

Step 111 represents responding to the discovery request message with a discovery confirmation message. The discovery confirmation message will include a session ID established by the QoS application 100 and include the MAC address of the access module 26. The discovery confirmation message may be unicast to the MTA 30 because the MAC address of the MTA 30 was provided to the QoS module 42 in the discovery request message.

Once the session is established, at various times a management event will occur. The MTA 30 will periodically send a "heart beat" message to the access module 26. Receipt of a "heart beat" message is a management event. Other management events include determining that a time of day message should be sent to the MTA 30, determining that a Syslog ID message should be sent to the MTA 30, and determining that a DHCP ID should be sent to the MTA 30. Step 112 represents a determination if management event has occurred. If yes, step 113 represents responding to the MTA 30 with an appropriate management message.

Step 114 represents receiving a bandwidth management instruction from the MTA 30. The table of FIG. 7 represents exemplary bandwidth management instructions which comprise: i) Dynamic Service Addition (DSA) 90, ii) Dynamic Service Change (DSC) 92, and Dynamic Service Delete (DSD) 94.

A DSA message instructs the QoS module 42 to request reservation and/or commitment of a time division logical channel from the network controller 20 for a new VoIP session. The DSA message 90 includes various data fields applicable to requesting a time division logical channel. The data fields comprise a service flow reference number 90a, requested frame frequency 90b, a requested frame size 90c, a requested jitter tolerance parameter 90d, a requested QoS policy 90e, a requested service state 90f (e.g. reserved or committed), and discrimination identification 90g.

The service flow reference number is identification assigned by the MTA 30 to for associating any DSA_Acknowledge message (discussed later) to the DSA message. The frame frequency 90b represents the quantity of frames that MTA 30 desires to send to the PSTN gateway 24 per period of time. The frame size 90c represents the desired size of each frame. The QoS policy 90e relates to whether the access module 26 is permitted to transmit other frames within the time division logical channel in the event that it is under-utilized by the MTA 30. The requested jitter tolerance parameter 90d represents the permitted deviation in the time between a scheduled transmission and the actual transmission upstream on the network 12. The requested service state 90f is an indicator of whether the time division logical channel should be reserved so that it is available for a pending VoIP session (but currently available for transmission of other frames) or whether it should be committed to the VoIP session wherein no other frames are transmitted therein.

The discrimination identification 90g is a representation of a characteristic of each media frame that can be utilized by the service flow module 38 to recognize IP frames for transmission on the time division logical channel. Typically the discrimination identification 90g will be at least a portion of the IP socket information that comprises one or more of a source IP address 91a, a source port number 91b (such as one of the reserved audio ports 43), a destination IP address 91c, and a destination port number 91d.

A DSC message 92 instructs the QoS module 42 to request a modification to an existing time division logical channel from the network controller 20. Such a request may be: i) a request to convert a reserved channel to a committed channel when the two endpoints of a VoIP session are ready to being the exchange of media data; ii) a request to convert a committed channel to a reserved channel in the event that one of the two VoIP endpoints places the other endpoint on "hold" and there is no immediate need for the exchange of media data; or iii) a request to increase the frame frequency or frame size in the event that a fax signal is detected by the MTA 30 and a fax compliant algorithm with a lower compression ratio than voice compliant algorithms must be utilized.

A DSC message 92 includes various data fields applicable to requesting a change of an existing time division logical channel. The data fields comprise a service flow ID field 92a which identifies the time division logical channel to be changed; a requested frame frequency 92b, a requested frame size 92c, a requested jitter tolerance parameter 92d, a requested QoS policy 92e, a requested service state 92f, and discrimination identification 92g.

A DSD message 94 instructs the QoS module 42 to release an existing time division logical channel—such as when a VoIP session is terminated. A DSD message 94 only requires a service flow ID 94a which identifies the time division logical channel to be released.

In response to receiving a bandwidth management instruction at step 114, the QoS application looks up the applicable DOCSIS_DQoS request(s) within the table 102 at step 115. Step 116 represents sending the DOCSIS_DQoS request(s) to the network controller 20 over the network 12.

Decision box 117 represent determining whether an acknowledgement was received from the network controller 20 within an applicable time out period. If not, the request(s) is resent at step 116. If a response is received, the response will include confirmation of the time division logical channel parameters. At step 118, the time division logical channel parameters (and the discrimination ID) are written to the discrimination table 106 and the service flow table 108 as represented by fields 109a-109e.

Step 119 represents looking up a bandwidth management acknowledge message that corresponds to the acknowledgement(s) received from the network controller 20 in the table 104. The table of FIG. 8, represents exemplary bandwidth management acknowledge messages. The acknowledge messages comprise: i) Dynamic Service Addition Acknowledge (DSA_ACK) 122, ii) Dynamic Service Change Acknowledge (DSC_ACK) 124, and Dynamic Service Delete Acknowledge (DSD_ACK) 126.

The DSA_ACK message 122 includes fields that confirm the time division logic channel established. The fields comprise a service flow reference number/service flow ID 122a; an acknowledged frame frequency 122b, an acknowledged frame size 122c, an acknowledged jitter tolerance 122d, an acknowledged QoS policy 122e, an acknowledged service state 122f, and an acknowledged discrimination identification 122g. The service flow ID identifies the time division logic channel and the service flow reference number is the number assigned by the MTA 30 such that the MTA 30 may associate the time division logic channel to the request.

The DSC_ACK message 124 includes fields that confirm the time division logic channel that was changed. The fields comprise the service flow ID 124a, an acknowledged frame frequency 124b, an acknowledged frame size 124c, an acknowledged jitter tolerance 124d, an acknowledged QoS policy 124e, an acknowledged service state 124f, and an acknowledged discrimination identification 124g.

The DSD_ACK message 126 acknowledges that a time division logical channel has been released. The message includes the service flow ID 126a of the released channel.

Returning to the flow chart of FIG. 3, step 120 represents sending the applicable bandwidth management acknowledge message to the MTA 30. Thereafter, the steps 112-120 are repeated.

SUMMARY

It should be appreciated that the systems and methods discussed herein provide for a stand alone multi-media terminal adapter that provides network address and port translation services to a plurality of data clients to enable each of such data clients and a VoIP module to share a single IP address assigned by a service provider.

Although the invention has been shown and described with respect to certain preferred embodiments, it is obvious that equivalents and modifications will occur to others skilled in the art upon the reading and understanding of the specification. For example, the exemplary embodiments discussed herein operate utilizing a cable modem and an HFC network. It is readily apparent to those skilled in the art that the teachings of the present invention may also be implemented on a DSL frame switched network. The present invention includes all such equivalents and modifications, and is limited only by the scope of the following claims.

What is claimed is:

1. A multi-media terminal adapter for coupling to a network access module over a communication link, the network access module for communicating IP frames over a frame switched network, the multi-media terminal adapter comprising:
   a wide area network interface coupled to the communication link for exchanging IP frames with the access module;
   a local area network interface for receiving outbound data client IP frames from each of a plurality of data clients, each outbound data client IP frame comprising local socket information, the local socket information comprising:
      a source address that includes a local area network IP address; and
      a data client port number;
   a VoIP module for generating outbound VoIP frames, each outbound VoIP frame comprising digital audio media and socket information that includes a VoIP port number selected from a first group of port numbers exclusively reserved for use by the VoIP module; and
   a router module coupled between the wide area network interface and each of the VoIP module and the local area network interface, the router comprising:
      means for receiving the outbound data client IP frames and the outbound VoIP frames;
      means for performing port translation on the outbound data client IP frames to generate translated outbound data client IP frames, each translated outbound data client IP frame comprising payload from the outbound data client IP frame and global socket information comprising a global IP address of the multi-media terminal adapter and a translated port number selected from a second group of port numbers, the second group of port numbers being mutually exclusive of the first group of port numbers and exclusively reserved for port translation of outbound data client IP frames;
      means for providing the outbound VoIP frames and the translated outbound data client IP frames to the wide area network interface;
      a translation table storing each translated port number in association with the local area network IP address and the data client port number associated therewith;
      means for receiving inbound IP frames, each inbound IP frame being addressed to the global IP address and including a destination port number;
      means for routing the inbound IP frame to the VoIP client if the destination port number is within the first group of port numbers; and
      means for generating a reverse translated IP frame if the destination port number is within the second group of port numbers, the reverse translated frame comprising payload from the inbound IP frame and including a destination address comprising the local area network IP address and the data client port number, that associated with the translated port number, replacing the global IP address and the destination port number from the inbound frame respectively; and
   wherein the VoIP module further includes a call set up module for establishing inbound VoIP communication channels by providing a remote VoIP device with the global IP address and an inbound VoIP port number selected from the first group of port numbers.

2. The multi-media terminal adapter of claim 1, wherein:
   the socket information of each outbound VoIP frame generated by the VoIP module further includes a source IP address which comprises the global IP address of the multi-media terminal adapter; and
   the router module further comprises means for routing the outbound VoIP frame generated by the VoIP module utilizing the source IP address and source port number assigned by the VoIP module.

3. The multi-media terminal adapter of claim 2, wherein:
   the router module further comprises means for routing the inbound IP frame to a signaling module of the VoIP module if the destination port number is within a third group of port numbers, the third group of port numbers being:
      mutually exclusive of the first group of port numbers and the second group of port numbers; and
      exclusively reserved for VoIP session signaling frames.

4. The multi-media terminal adapter of claim 3, further comprising:
   a PSTN driver for generating subscriber loop signaling and PSTN media communications; and an audio DSP for coupling between the PSTN driver and the VoIP client and for converting between:
PSTN audio media and the digital audio media; and
PSTN in band signaling and digital signaling.

5. The multi-media terminal adapter of claim 4, further comprising a DHCP server for assigning the local area network address to each data client.

6. The multi-media terminal adapter of claim 1, wherein:
the socket information of each outbound VoIP frame generated by the VoIP module further includes a source IP address which comprises an IP address that is different from the global IP address; and
the router module further comprises means for translating only the IP address of each outbound VoIP frame prior to providing the outbound VoIP frame to the wide area network interface and routing a translated outbound VoIP frame utilizing the global IP address of the multi-media terminal adapter an the source port number assigned by the VoIP module.

7. The multi-media terminal adapter of claim 6, wherein:
the router module further comprises means for routing the inbound IP frame to a signaling module of the VoIP module if the destination port number is within a third group of port numbers, the third group of port numbers being:
mutually exclusive of the first group of port numbers and the second group of port numbers; and
exclusively reserved for VoIP session signaling frames.

8. The multi-media terminal adapter of claim 7, further comprising:
a PSTN driver for generating subscriber loop signaling and PSTN media communications; and
an audio DSP for coupling between the PSTN driver and the VoIP client and for converting between:
PSTN audio media and the digital audio media; and
PSTN in band signaling and digital signaling.

9. The multi-media terminal adapter of claim 8, further comprising a DHCP server for assigning the local area network address to each data client.

10. The multi-media terminal adapter of claim 1, further comprising:
a bandwidth management module coupled between the VoIP client and the wide area network interface for providing bandwidth management instructions to the access module and receiving acknowledgement messages from the access module; and
each bandwidth management instruction commanding the access module to establish a time division logical channel over the frame switched network for supporting the exchange of IP frames between the multi-media terminal adapter and a remote VoIP endpoint.

11. The multi-media terminal adapter of claim 10, wherein the instruction to establish a time division logical channel comprises a discrimination identifier identifying a characteristic of the IP frames to which the time division logical channel will apply, the identifier being the VoIP port number from the first group of port numbers.

12. A method of sharing a single connection to an access module, that is coupled to a frame switched network, amongst a VoIP client and a plurality of data clients coupled to a local area network, the method comprising:
receiving outbound data client IP frames from each of the plurality of data clients, each outbound data client IP frame comprising local socket information that includes a local area network IP address and a data client port number;
generating outbound VoIP frames, each outbound VoIP frame comprising:
digital audio data payload representing a portion of an audio session; and
socket information that includes a VoIP port number selected from a first group of port numbers exclusively reserved for use by the VoIP module;
performing port translation on the outbound data client IP frames to generate translated outbound data client IP frames, each translated outbound data client IP frame comprising payload from the outbound data client IP frame and global socket information comprising a global IP address of the multi-media terminal adapter and a translated port number selected from a second group of port numbers that is:
mutually exclusive of the first group of port numbers; and
exclusively reserved for port translation of outbound data client IP frames;
providing the outbound VoIP frames and the translated outbound data client IP frames to the access module;
establishing inbound VoIP communication channels by providing a remote VoIP device with the global IP address and an inbound VoIP port number selected from the first group of port numbers; and
wherein:
wherein the step of performing port translation on the outbound data client IP frames comprises storing each translated port number in association with the local area network IP address and the data client port number in a translation table; and
the method further comprises:
receiving inbound IP frames, each inbound IP frame being addressed to the global IP address and including a destination port number;
routing the inbound IP frame to the VoIP client if the destination port number is within the first group of port numbers; and
generating a reverse translated IP frame if the destination port number is within the second group of port numbers, the reverse translated frame comprising payload from the inbound IP frame and including a destination address comprising the local area network IP address and the data client port number, that associated with the translated port number, replacing the global IP address and the destination port number from the inbound frame respectively.

13. The method of claim 12, wherein:
the socket information of each outbound VoIP frame further includes a source IP address which comprises the global IP address of the multi-media terminal adapter assigned by a VoIP module; and
the method further comprises routing the outbound VoIP frame generated by the VoIP module utilizing the source IP address and source port number assigned by the VoIP module.

14. The method of claim 13, wherein:
routing the inbound IP frame to a signaling module of the VoIP module if the destination port number is within a third group of port numbers, the third group of port numbers being:
mutually exclusive of the first group of port numbers and the second group of port numbers; and
exclusively reserved for VoIP session signaling frames.

15. The method of claim 14, further comprising:
generating PSTN media communications for driving a remote PSTN device; and converting between:

PSTN audio media and the digital audio media of outbound VoIP frames; and digital audio media of inbound VoIP frames and PSTN audio media.

16. The method of claim 15, further comprising assigning the local area network address to each data client.

17. The method of claim 12, wherein:
the socket information of each outbound VoIP frame generated by the VoIP module further includes a source IP address which comprises an IP address that is different from the global IP address; and
the method further comprises translating only the IP address of each outbound VoIP frame prior to providing the outbound VoIP frame to the access module and routing a translated outbound VoIP frame utilizing the global IP address of the multi-media terminal adapter and the source port number assigned by the VoIP module to the access module.

18. The method of claim 17, wherein:
routing the inbound IP frame to a signaling module of the VoIP module if the destination port number is within a third group of port numbers, the third group of port numbers being:
mutually exclusive of the first group of port numbers and the second group of port numbers; and
exclusively reserved for VoIP session signaling frames.

19. The method of claim 18, further comprising:
generating PSTN media communications for driving a remote PSTN device; and converting between:
PSTN audio media and the digital audio media of outbound VoIP frames; and
digital audio media of inbound VoIP frames and PSTN audio media.

20. The method of claim 19, further comprising assigning the local area network address to each data client.

21. The method of claim 12, further comprising:
providing bandwidth management instructions to the access module and receiving acknowledgement messages from the access module; and
each bandwidth management instruction commanding the access module to establish a time division logical channel over the frame switched network for supporting the exchange of IP frames between the multi-media terminal adapter and a remote VoIP endpoint.

22. The method of claim 21, wherein the instruction to establish a time division logical channel comprises a discrimination identifier identifying a characteristic of the IP frames to which the time division logical channel will apply, the identifier being the VoIP port number from the first group of port numbers.

* * * * *